United States Patent
Fink

(10) Patent No.: US 9,057,604 B1
(45) Date of Patent: Jun. 16, 2015

(54) POINT-AHEAD LASER POINTER-TRACKER SYSTEMS WITH WAVEFRONT CORRECTION IN BOTH TRANSMIT AND RECEIVE DIRECTIONS

(75) Inventor: David Fink, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 07/338,009

(22) Filed: Apr. 14, 1989

(51) Int. Cl.
*G01B 11/26* (2006.01)
*G01C 1/00* (2006.01)

(52) U.S. Cl.
CPC . *G01B 11/26* (2013.01); *G01C 1/00* (2013.01)

(58) Field of Classification Search
CPC .................................. G01B 11/26; G01C 1/00
USPC .................... 356/139, 139.01–139.1, 152, 356/152.1–152.3; 89/1.11; 250/201 R–203 R, 201–203; 455/611
See application file for complete search history.

(56) References Cited

U.S. PATENT DOCUMENTS 3,437,825 A * 4/1969 Studebaker .................. 356/3.12

* cited by examiner

*Primary Examiner* — Luke Ratcliffe
(74) *Attorney, Agent, or Firm* — Donald F. Mofford

(57) ABSTRACT

Point-ahead laser pointer-tracker systems with stabilization and wavefront correction in both transmit and receive directions provide arrangements for sensing the wavefront correction required in two different directions, one in the received target image direction for good image quality in the tracker and the other in the point-ahead direction for good beam quality on the target. In the several embodiments, a marker beam is aligned with the target image. Wavefront aberration correction signals are produced by an output wave sensor that senses the wavefront of the marker beam in the received target image direction and the wavefront of the source laser beam in the point-ahead transmit direction. The alignment is maintained by use of the output wave sensor signals together with signals from the tracker of the target and current aimpoint positions. These signals, compared in selected pairs, control mirrors in various legs of the optical system to put the current aimpoint on the desired aimpoint and to align the marker beam along the received target image direction.

11 Claims, 15 Drawing Sheets

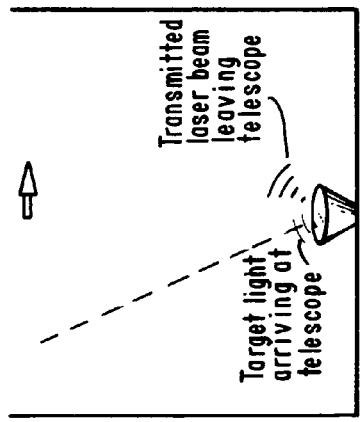
Fig. 3a.
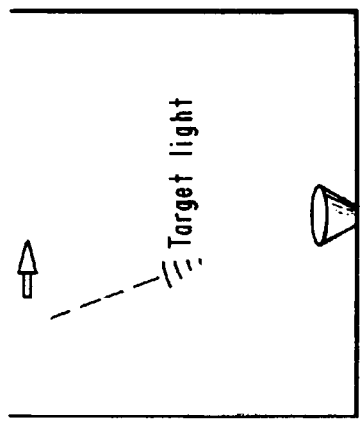
Fig. 3b.
Fig. 3c.
$$\theta = \frac{vt}{R}$$
$$t = \frac{2R}{c}$$
$$\theta = \frac{2v}{c}$$
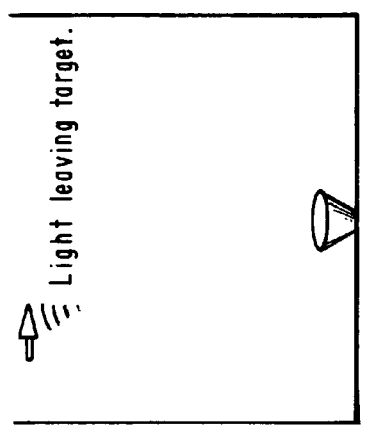
Fig. 3d
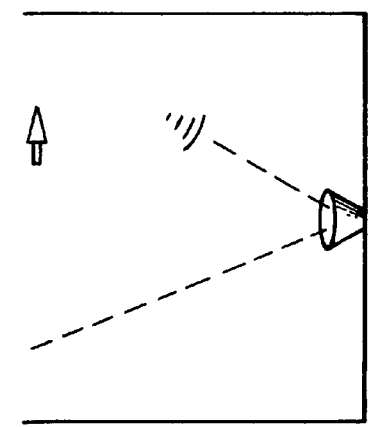
Fig. 3e.

System 1-1

System 1-2

System 1-2
Deformable mirrors

System 2-1

System 2-1a

System 2-2

System 3-1

System 3-2

POINT-AHEAD LASER POINTER-TRACKER SYSTEMS WITH WAVEFRONT CORRECTION IN BOTH TRANSMIT AND RECEIVE DIRECTIONS

STATEMENT OF GOVERNMENT INTEREST

This invention was made with government support under contract F29601-86-C-0236 awarded by the Department of the Air Force. The government has certain rights in this invention.

BACKGROUND OF THE INVENTION

1. Field of the Invention

This invention relates generally to laser pointer-tracker systems and particularly to point-ahead laser pointer-tracker systems.

2. Description of the Related Art

Presently known prior art systems employing shared apertures do not provide any way to sense the wavefront corrections needed in both the transmit and receive directions. There is no local beam in the direction of the received target image, so any wavefront correction on the target image either has to use the dim target image itself to sense the needed corrections, or else it is assumed that the target image direction corrections are the same as those in the transmitted, point-ahead, directions.

In direct (non-point-ahead) systems, the transmit and receive directions are the same, so that a local beam aligned in the transmit direction is also aligned with the received target image and can be used for sensing the wavefront corrections needed in the received direction.

Presently known prior art systems employing a stable platform use only a single marker beam aligned in the transmit direction. When applied to a point-ahead system in which this marker beam is driven in the point-ahead direction to point the transmitter laser, the single stable beam will only stabilize the transmitted laser beam and the common path. It does not stabilize the tracker image against jitters in the tracker-marker leg or against what the shared aperture component may do to the tracker-marker leg that it does not do to the common path.

There is no presently known prior art directed to separate aperture, stable platform, point-ahead laser transmitters. Presently known prior art systems of the separate aperture type have been direct pointing (not point-ahead), and, as noted above, point-ahead prior art has been of the shared aperture type.

SUMMARY OF THE INVENTION

Improved point-ahead laser pointer-tracker systems are provided by this invention.

In a first embodiment of this invention employing a shared aperture, energy returned from the current aimpoint on the target is used in computing the point-ahead angle. The transmitted beam direction is driven by a servo loop in response to the angular difference between the locations of the images of the current aimpoint and the desired aimpoint on the target. The pointing servo loop performing this computation steers the transmitted laser beam to the correct point-ahead angle without any loop corrections or offsets in the loop. One implementation of this first embodiment uses the reflected energy of the transmitted laser beam to sense the current aimpoint. The second implementation of this first embodiment uses the reflected energy of a designator laser beam aligned to the transmitted laser beam to compute the point-ahead angle. Both versions provide a marker laser beam along the received target image direction to enable wavefront correction of the target image path without relying on the dim target image itself for the correction information.

In a second embodiment of this invention employing a shared aperture, an inertially stabilized platform with two beams is used, rather than the usual single beam. One stable platform laser beam is driven by the image of the target in the tracker; this beam in turn drives the marker laser beam in the direction of the received target wavefront. The second stable platform laser beam is driven by the image of the current aimpoint; this beam in turn drives the transmitted laser beam to seek the correct point-ahead angle.

In a third embodiment of this invention, separate apertures are employed for the receiver and transmitter telescopes. Each uses its own inertially stabilized platform reference projecting a stabilized beam, but the transmitter stabilized beam is driven by a signal from the tracker based upon the difference between the locations of the images in the tracker of the current aimpoint and a marker reference. The receiver stabilized beam is driven by the difference between the locations of the marker reference image and the image of the desired aimpoint in the tracker.

All three embodiments employ full-aperture, high signal level, wavefront aberration sensing beams in both the transmit and receive directions to enable wavefront correction independently and simultaneously in both the transmit and receive directions without relying on the dim target signal for wavefront control.

BRIEF DESCRIPTION OF THE DRAWINGS

FIG. 3a through 3e illustrate point-ahead as used herein;

DESCRIPTION OF THE PREFERRED EMBODIMENTS

Comparison of the Three Embodiments

The main problem all three embodiments of this invention solve is how to sense the wavefront correction needed in two different directions, one in the received target image direction for good image quality in the tracker and the other in the point-ahead transmit direction for providing good beam quality on the target.

These inventions have the following important properties:
1. They are closed-loop point-ahead pointing/tracking systems.
2. They provide internal wavefront ing beams to provide wavefront correction independently in the receive and transmit directions.
3. They do not rely on the dim target image to do wavefront correction in the receive direction.
4. The stable platform systems stabilize both the transmit and receive paths.

Figure 4:
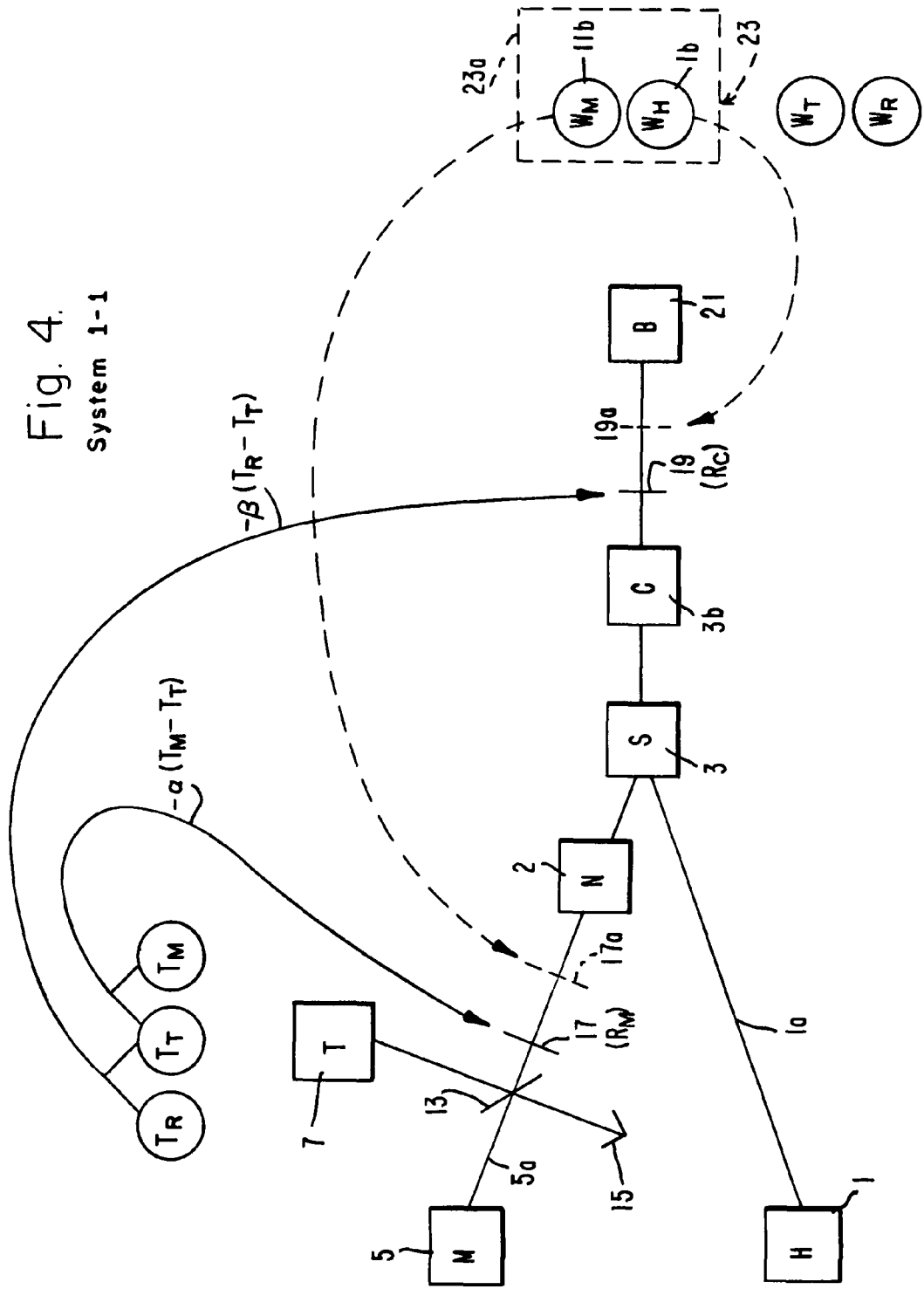
FIG. 4 is a block diagram of a first point-ahead system (System 1-1) showing one implementation of the first embodiment of this invention.

In a first embodiment of this invention, employing a shared or common aperture, a first implementation, System 1-1, FIG. 4, introduces a marker laser beam M and aligns it with the beam of the target image. The output wave sensor at its focal plane 23a then senses the wavefront $W_M$ of the marker laser beam in the target direction and the wavefront $W_H$ of the source laser beam in the transmit direction for providing wavefront correction. A second implementation of the first embodiment of this invention, System 1-2, FIG. 5 adds an aimpoint designator laser beam D in the transmit direction, which can also be wavefront corrected, FIG. 5a.

The second embodiment of this invention, also employing a shared aperture, does the same things in a system employing an inertially stabilized platform reference system. There are at least two ways of implementing a stabilized platform reference system. One comprises a stable flat mirror reflecting the laser beam and an autocollimator receiving the reflected beam for correcting beam direction. Another, and the one used in all the examples shown here, provides a directionally stable laser beam as a reference for correcting beam directions. A novel feature of the stable platform embodiments of this invention is the provision of a stable platform (25 of FIGS. 8, 8a, and 9) with two stable beams—one, P, in the target image direction and one, Q, in the transmit direction. As presently known, stable platform systems have always had a single stable beam, and it was aligned in the transmit direction. When applied to point-ahead systems, the single stable beam will only stabilize the transmitted source laser beam H and the common path 3b. It does not stabilize the tracker image against jitters in the tracker/marker leg 2 or against what the shared aperture component 3 may do to the tracker/marker leg 2 that it does not do to the common path 3b.

Figure 10:
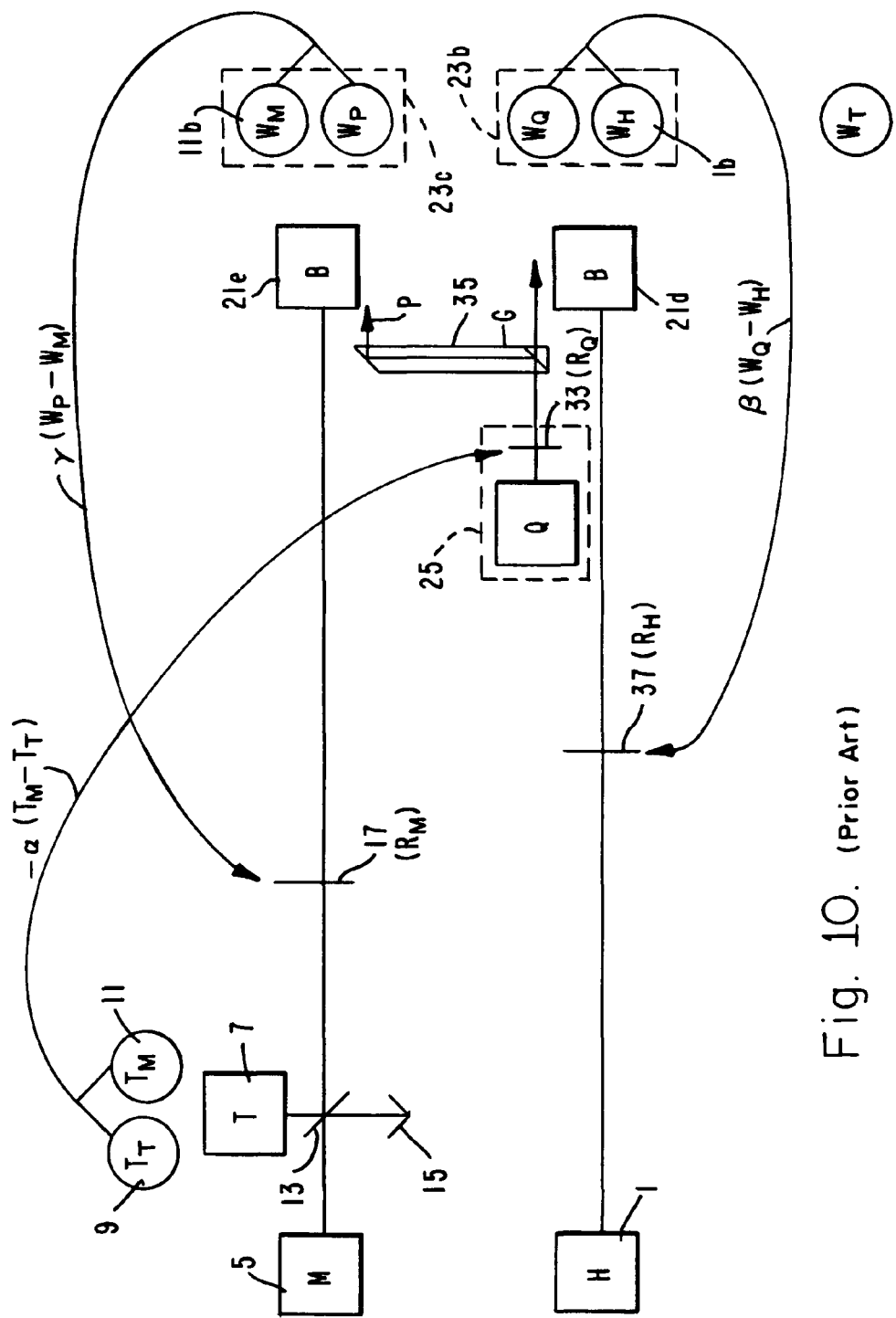
FIG. 10 is a prior art, separate aperture, stable platform, pointer-tracker without point-ahead capabilities.

The third embodiment of this invention shows how to do the same things using a separate aperture system and shows that a periscope transfer, 35, FIG. 10, as used in the prior art, is not required for the point-ahead mode.

Selected terms as used herein are defined below.

Current aimpoint (subscript R): Where the transmitted laser beam actually goes, relative to the target.

Desired aimpoint (subscript T): Where on the target we want the transmitted laser to hit.

Shared aperture: Beams leave from or arrive at the pointing and tracking system through a shared or common element.

Separate aperture: Beams transmitted from and received at the pointing and tracking system traverse separate elements.

First Embodiment

Prior Art

Figure 1:
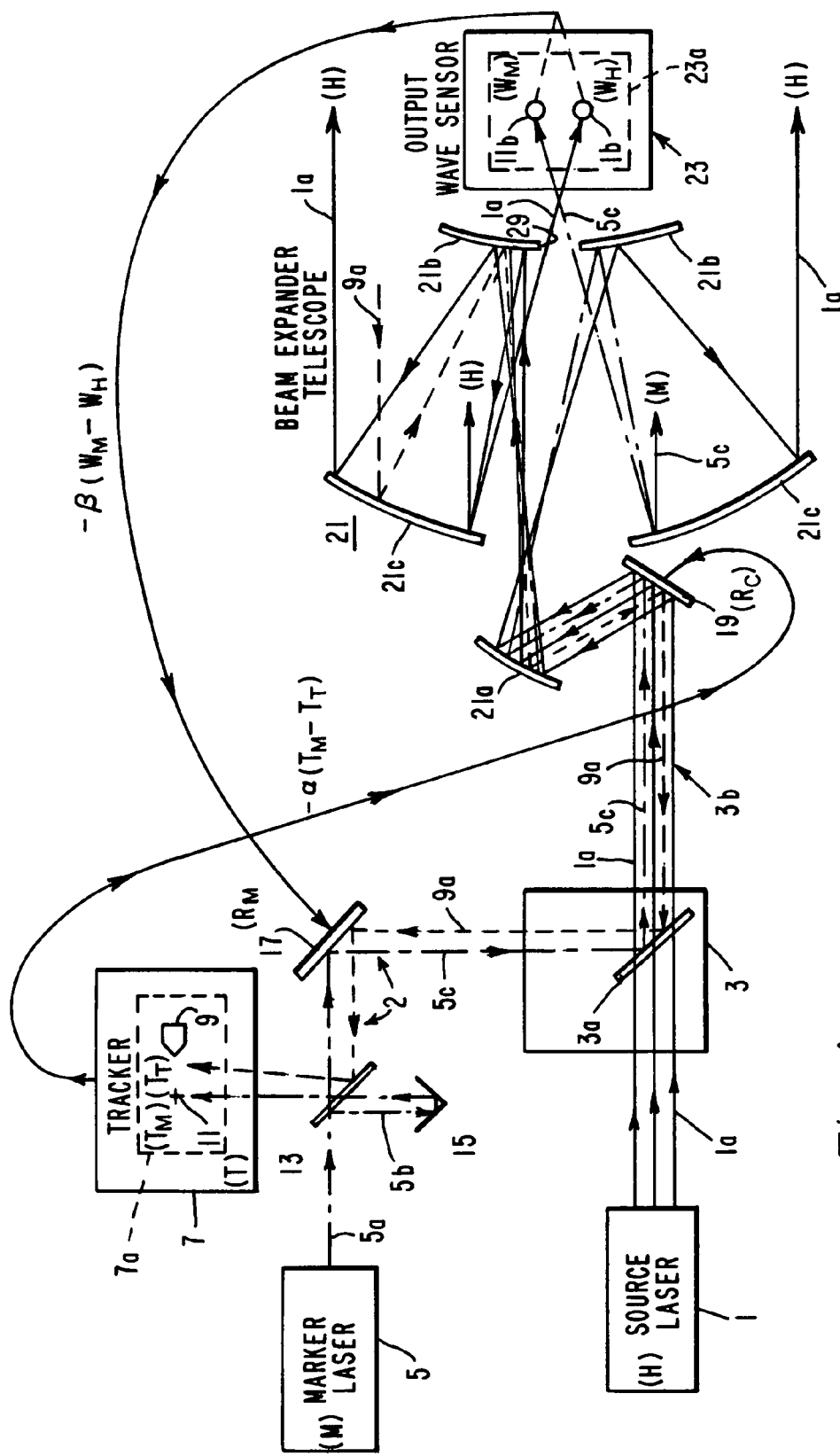
FIG. 1 is a block diagram illustrating a prior art type of shared aperture pointer-tracker system without point-ahead capability.

FIG. 1 shows a typical prior art, shared aperture, laser pointer-tracker without point-ahead capability. A laser source 1, which may be a high energy laser, its output depicted as a laser beam 1a, is coupled to the shared aperture component 3, which includes a beam splitter 3a. This shared aperture component provides the full aperture sharing between the laser source 1, a tracker 7, and a marker laser 5. The focal plane 7a of the tracker 7 has an image 9 of the target and a marker reference spot 11 from the marker laser 5. The marker reference spot 11, depicted as a cross, is derived from the marker laser beam 5a by splitting the marker beam at a beam splitter 13 in front of the tracker 7. The split-off portion 5b of the marker laser beam 5a goes through a corner cube retro-reflector 15 and then back through the beam splitter 13 to produce the marker reference spot 11 on the focal plane 7a of the tracker 7. The non-split-off portion of the marker laser beam 5a continues through the beam splitter 13 to join the source laser beam 1a at the shared aperture component 3. The path includes a beam steering mirror 17 in the marker leg 2 and the beam splitter 3a of the shared aperture component 3. A beam steering mirror 19 is used in the common leg or path 3b to move the desired target aimpoint 9 onto the marker reference spot 11 in the focal plane of the tracker 7. By this expedient, target beam 9a becomes parallel to the marker laser beam 5c in the marker leg 2.

The source laser beam 1a and the marker laser beam 5c travel together in the common leg 3b out of the shared aperture component 3 to a beam expander or telescope, generally designated 21. As shown here, the beam expander is an on-axis, three mirror telescope with tertiary, secondary, and primary mirrors 21a, 21b and 21c. The primary mirror 21c is provided with a conventional holographic diffraction grating to sample both beams 1a and 5c propagating through the common leg 3b and form focused spots or wavefront images 1b and 11b, respectively, on a focal plane 23a of an output wave sensor 23 located behind a hole 29 in the center of the secondary mirror 21b. The location of the marker laser beam spot 11b on the focal plane 23a of the output wave sensor 23 represents a direction of the marker laser beam 5c, which was made parallel to the direction to the target. The location of the source laser beam spot 1b on the focal plane of the output wave sensor 23 represents the direction of the source laser beam 1a. By means of a servo loop, having a gain $-\beta$, that moves or steers the beam steering mirror 17 to put the marker beam spot 11b on the source laser beam spot 1b, the marker laser beam and the source laser beam are made to point in the same direction. This steering of the beam steering mirror 17 moves the desired aimpoint 9 off of the marker reference spot 11 on the tracker focal plane 7a. By means of a servo loop having a gain $-\alpha$, the beam steering mirror 19 in the common path 3b is now turned to bring the desired aimpoint 9 and the marker reference 11 back together. Now the desired aimpoint 9 on the target and the marker reference spot 11 in the focal plane 7a of the tracker are aligned, and the marker laser beam 5c and the laser source beam 1a are also aligned, so the target beam 9a and the laser source beam 1a are aligned.

Figure 2:
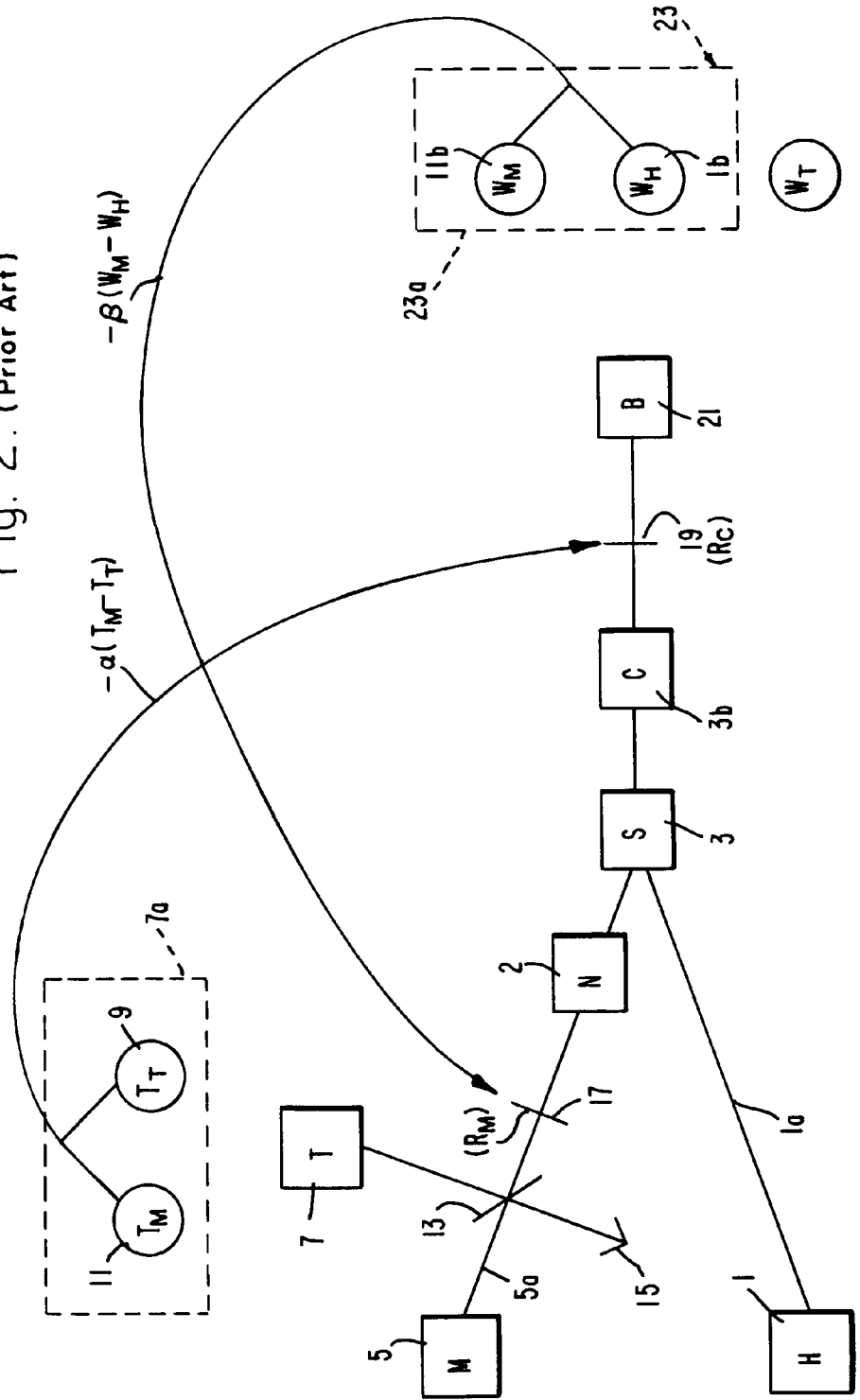
FIG. 2 is a schematic representation of the function of the system of FIG. 1.

Continuing with the discussion of prior art FIG. 1, FIG. 2 contains all the essential features of the system of FIG. 1 and forms the basis for a mathematical analysis of FIG. 1. The numbers adjacent to the individual elements of FIG. 2 relate these elements to the elements of FIG. 1. The letters associated with these elements are used as terms in the equations that follow below. These terms are defined as the description develops.

In FIG. 2, H relates to the source laser beam and represents the angular direction of the laser source beam 1a and any angular disturbances or jitters thereof by the optical train or path that brings the source laser beam to the shared aperture component 3, here having its characteristics or function represented by S. H also includes any effects the shared aperture component 3 has on the laser source beam 1a that the shared aperture component 3 does not have on the other two legs, the other two legs being the tracker/marker leg 2 and the common path leg 3b. As a beam propagates through the system, any angular deviations are algebraically additive (actually vectorially, since deviations can be in both cross-propagation directions). H therefore also includes any deviations that the common path 3b puts into the source laser beam 1a that it does not put onto the tracker/marker beam 5c, for example, wavelength dependent effects caused by errors in the high reflectivity coatings on the optics, or relative deviations caused by the irradiance profiles not being the same for both the source laser beam and the laser marker beam, so distortions that are not uniform across an optic may cause different effective tilts in the two beams.

Continuing with FIG. 2 and the prior art, M relates to the marker laser beam and represents tilt in the marker laser beam 5a and its optics before the tracker beam splitter 13. N represents tilts after the beam splitter 13, including anything the shared aperture component 3 does uniquely to the marker path 2 and any effects in the common path 3b that are unique to the marker laser 5. C represents the deviations in the common path or leg 3b. B represents the beam expander or telescope 21. The effects of the beam expander 21 are included in C. T represents the characteristics of the tracker 7. Therefore characters $T_M$ and $T_T$ denote the marker reference spot or image 11 and the target image desired aimpoint 9, respectively, in the focal plane of the tracker 7. The difference in position in the tracker focal plane between these images or spots, which represents the angular error, is multiplied by the servo loop gain $-\alpha$ and applied to the beam steering mirror 19 in the common path or leg 3b, here represented as $R_C$. The laser marker beam 5c and the laser source beam 1a are transmitted to the telescope, and the reference characters $W_M$ and $W_H$ represent their wavefronts as sampled by the output wave sensor 23. The difference between their directions ($W_M-W_H$) is multiplied by the servo loop gain $-\beta$ and applied to the beam steering mirror 17 in the marker path or leg 2, the characteristics of which are here represented as $R_M$. The reference character $W_T$ denotes the wavefront of the image of the target, seen as reflected beam 9a of FIG. 1.

Figure 3:
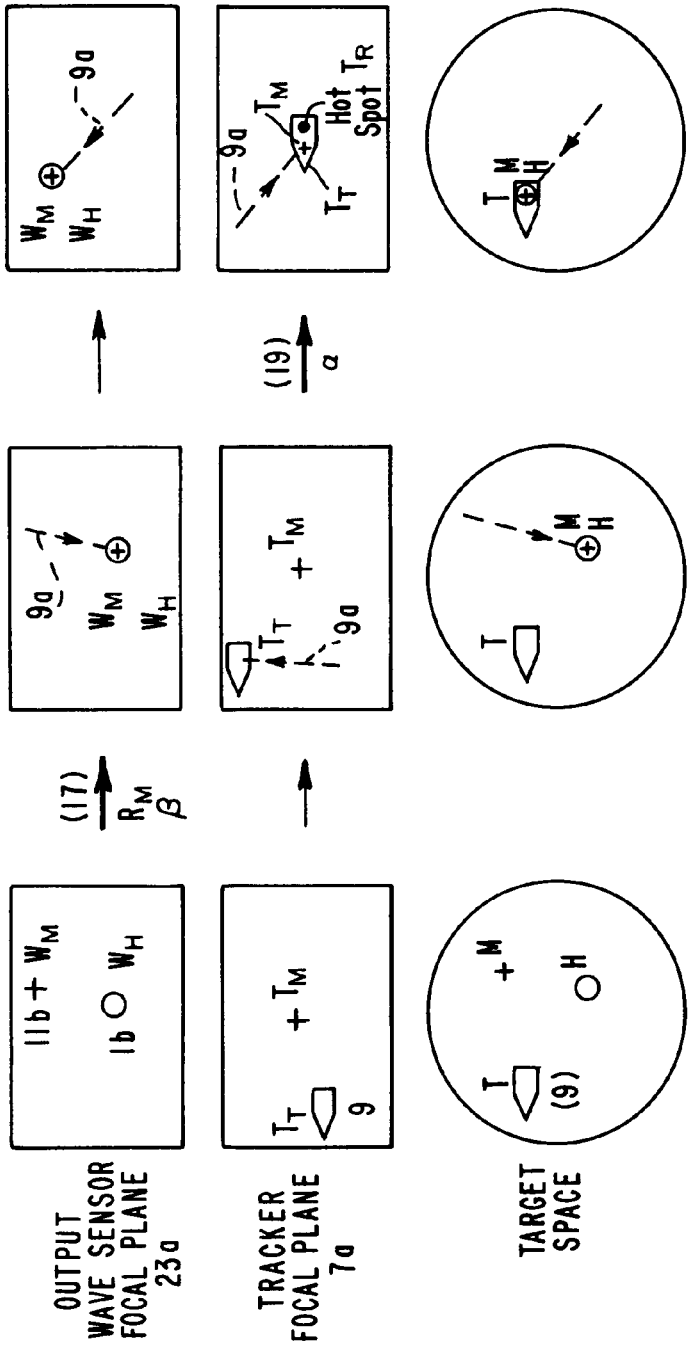
FIG. 3 depicts the operation of aimpoint control in the system of FIG. 1.

Continuing further with a discussion of the prior art of FIG. 1, FIG. 3 shows the images in the focal plane 23a of the output wave sensor 23 and the focal plane of the tracker 7. FIG. 3 also shows what is happening in target space as the pointing servo loops operate. For the purposes of explanation, the operations of the pointing servo loops a and A are described as though they operate in sequence. The pointing loops actually operate simultaneously in the system. In the focal plane 23a of the output wave sensor 23, the cross represents the marker laser beam image or spot 11b and the circle represents the source laser beam image or spot 1b in the output wave sensor focal plane 23a of FIG. 1. In the tracker focal plane 7a, the cone represents the target 9 ($T_T$), the cross represents the marker reference spot 11 ($T_M$), and the black dot in the last tracker focal plane frame is the actual current aimpoint $T_R$ of the source laser beam on the target. In the last target space frame, if the target velocity were zero, so that the point-ahead angle were zero, the current aimpoint circle H would fall on the cross M, and the circle and cross would be centered on the desired aimpoint on the target T.

Equations 1-7 and Tables I, II and III are useful in describing this system.

$$R_M=-\beta(W_M-W_H) \quad\quad 1$$

$$R_C=-\alpha(T_M-T_T) \quad\quad 2$$

$$T_M=M \quad\quad 3$$

$$M+R_M+N+C+R_C=W_M \quad\quad 4$$

$$T_T+R_M+N+C+R_C=W_T \quad\quad 5$$

$$H+C+R_C=W_H \quad\quad 6$$

$$W_H-W_T = H\frac{1+\alpha+\beta}{(1+\alpha)(1+\beta)} - (M+N)\frac{\alpha}{(1+\alpha)(1+\beta)} + \frac{C-W_T}{1+\alpha} \quad\quad 7$$

TABLE I

| $W_H-W_T$ | H | M,N | C | $W_T$ |
|---|---|---|---|---|
| | $\frac{1+\alpha+\beta}{(1+\alpha)(1+\beta)}$ | $\frac{-\alpha}{(1+\alpha)(1+\beta)}$ | $\frac{1}{1+\alpha}$ | $\frac{-1}{1+\alpha}$ |

TABLE II

LOW FREQUENCY FOURIER COMPONENTS

| $W_H-W_T$ | H | M,N | C | $W_T$ |
|---|---|---|---|---|
| | $\frac{1}{\alpha}+\frac{1}{\beta}$ | $-\frac{1}{\beta}$ | $\frac{1}{\alpha}$ | $-\frac{1}{\alpha}$ |

TABLE III

HIGH FREQUENCY FOURIER COMPONENTS

| $W_H-W_T$ | H | M,N | C | $W_T$ |
|---|---|---|---|---|
| | 1 | $-\frac{\alpha}{\beta}$ | 1 | $-1$ |

A simple mathematical analysis can quantify how well the system works. The equations use the designations of FIG. 2. First are the pointing equations, Eqn. 1 and Eqn. 2, for the servo-driven mirrors: the mirror 17 ($R_M$ Eqn. 1) in the marker leg 2 is driven in the pointing loop $-\beta$ by the difference between the directions of the marker laser beam 5c and the source laser beam 1a as measured by the difference in locations of the wavefront images $W_M$ and $W_H$ in the focal plane 23a of the output wave sensor 23, and the mirror 19 ($R_C$ Eqn. 2) in the common leg 3b is driven in the pointing servo loop $-\alpha$ by the difference between the locations of the marker reference spot $T_M$ and the target image desired aimpoint $T_T$ in the tracker focal plane 7a. Equation 3 states that the location of the marker reference spot $T_M$ is just the direction of the marker laser beam 5a (M), including the accumulated deviations up to the beam splitter 13. Equation 4 follows the marker laser beam 5a from its source M to its focal plane spot $W_M$ at the output wave sensor 23, adding up all tilts in the optical path. Equation 5 follows the target beam 9a from the target image $T_T$ in the tracker back to the target wavefront $W_T$ as it enters the telescope, adding up all tilts in the optical path. Finally, all tilts on the source laser beam 1a are accumulated to find its image $W_H$ at the focal plane of the output wave sensor 23, Eqn. 6. These six equations can then be solved for the angle $W_H$-$W_T$ between the source laser beam and target wavefronts in target space at the entrance to the beam expander or telescope 21. This difference is the pointing error $W_H$-$W_T$ in Eqn. 7.

It is noted at this point that the optical diagrams of FIGS. 1 and 2 do not represent the only way to connect the servo loops. There are three legs into which the two steering mirrors may be put and two control lines (servo loops), for six possible combinations. These six possible combinations are not shown here in the interest of simplicity. The three legs that are involved are the legs 1a, 3b and 2.

The coefficients of the terms of the pointing error equation, Eqn. 7, above, are given in Table I. The best way to interpret these terms is that they represent the effect on each Fourier component; i.e., each term is the amount of jitter at a particular frequency, and $\alpha$ and $\beta$ are the loop gains at that frequency. To include phase shifts in the gains and relative phases in the jitter of different components, each term is a complex number with both real and imaginary parts. With respect to the low frequency components, the loop gains are large and the coefficients of the terms can be simplified, as shown in Table II. The servo loops attenuate the disturbances from all sources to give accurate pointing.

At higher frequencies, the gain, a, of the tracker loop must roll off because the target image 9 is a low level signal and the bandwidth of the tracker 7 must be made narrow to increase the signal-to-noise ratio. The output wave sensor 23 has high-level signals and can have a wide bandwidth. Therefore at higher frequencies, the value of a will become very small while the value of $\beta$ remains large. The coefficients of the terms can be simplified again under these conditions to give the high frequency results seen in Table III. High frequency real motions of the target show up as pointing errors, but any high frequency jitter in the common path 3b also becomes a pointing error. An inertially stabilized platform reference, which is employed in the second and third embodiments of this invention, minimizes high frequency jitter disturbances.

The details of the prior art system above are useful in describing and in understanding this invention and are relied upon in the descriptions of the three embodiments.

The Point-Ahead Problem

All Embodiments

FIG. 3a shows the telescope of a pointer-tracker at the bottom of the figure and a target moving across the top. Light is shown leaving the target. This light might be self-luminance, thermal radiation, reflected designator beam, or reflected sunlight or other available light. FIG. 3b shows the target having moved some distance to the right and the previously emitted light not yet having reached the telescope. FIG. 3c shows the light arriving at the telescope and the laser transmitter light leaving the telescope. These are in different directions, the direction of the transmitted light leading the target. FIG. 3d shows the transmitted light in flight as the target continues moving ahead. FIG. 3e shows the transmitted light arriving at the target.

The point-ahead angle is the angle between the received and transmitted directions, and can be calculated from the figure. If the target is moving at velocity v and is at range R, the time from when light leaves the target to when the transmitted light arrives at the target is the round trip time t=2R/c, where c is the speed of light. The point-ahead angle, $\theta$, from FIG. 3e is $\theta$=vt/R (for small values of $\theta$). Substituting the value of t into the equation for $\theta$ gives $\theta$=2v/c.

The receive direction can be called the "apparent target direction." It is not the "target direction" because the target is not there when the light is received.

Note there is no processing time in the equation between the reception of the target light and the transmission of the laser light. This is because it is assumed that the target is being continuously tracked, and therefore the received direction represents the direction of the received light at the instant the transmitted beam is launched. If the target is not being tracked continuously, such as if it is being tracked with light from a pulsed laser, then processing time must be included in the time equation to get the "apparent point-ahead angle," which is the angle between where the receiver last saw the target when it received the pulsed tracking light and where the transmitter must point the laser to hit the target. All of the point-ahead inventions here will work with either situation.

First Embodiment

Advantages

The first embodiment of this invention comprises a shared aperture, laser transmitter pointing and tracking system with independent wavefront correction for the transmitter laser and received target image. Two implementations of this pointing and tracking system that solve the point-ahead problem are described. The first system, System 1-1, FIG. 4, uses the energy of the transmitted source laser beam reflected from the target in conjunction with the target image to solve the point-ahead problem and place the transmitted source laser beam on the desired aimpoint on the target. The second system, System 1-2, FIGS. 5 and 5a, uses a shared aperture designator laser beam coaligned with the transmitted source laser beam to designate the current aimpoint on the target. The reflected designator energy is used in conjunction with the target image to solve the point-ahead problem and place the transmitted beam on the desired aimpoint on the target. The designator also has independent wavefront correction. All control loops are closed with no offsets or open loop corrections; they drive their discriminants to zero.

The choice of one of these two systems depends on the wavelengths of the transmitter source laser beam and the target image and the available tracker detectors. If the tracker 7 is sensitive to the wavelengths of the target image and the reflected transmitted source laser beam, then the first system, System 1-1, can be used. If the tracker 7 is not sensitive to both of these wavelengths, then the second system, System 1-2, must be used, with the designator laser beam wavelength chosen to be within the tracker's spectral range.

The advantage provided by both implementations of this first embodiment of this invention is that independent wavefront correction is provided for both the transmitted source laser beam and the received or reflected target image beam. Wavefront correction for the received target image beam is sensed by the local marker laser beam without reliance on the dim target image itself for the correction information. System 1-2, with an aimpoint designator laser beam, allows independent wavefront correction of the designator laser beam also. (The target image and the designator laser beam image require different wavefront corrections because they are looking in different directions in the field of view of the beam expander 21.)

It is assumed that the system must deal with dim targets, so that the target image cannot be used to generate wavefront correction for its own path. Also, the target is an extended object, which is more difficult to use for correction information than a point source. A shared aperture marker laser beam 5c exactly aligned with the received target beam 9a is provided for this purpose. This marker laser beam can be sampled by a holographic diffraction grating on the telescope primary as referenced in FIG. 1 to drive a wavefront correction system to obtain perfect target image quality. The outgoing transmitted source laser beam 1a can also be sampled to drive a second wavefront correction system to obtain perfect beam quality in the transmitted beam. System 1-2, with an aimpoint designator laser beam D coaligned with the transmitter source laser beam, can implement a third output wavefront correction system to obtain perfect beam quality on the designator. Note that the sampled beams are aligned in two different directions, one in the received target image direction and the second in the point-ahead direction, so that they correctly sample the optical errors in the different directions in the field-of-view of the beam expander. (Beam expanders generally have significantly different aberrations for the two directions.)

If the wavefronts of the outgoing beams (marker and source or marker and designator) are sampled, the angle between them, which is the point-ahead angle, can be measured to obtain the target cross-range velocity: the point-ahead angle is 2v/c, where v is the target cross-range velocity and c is the speed of light. In addition, since the target is being tracked, its angular velocity is also known, and the ratio of angular to cross-range velocity gives the target range.

First Embodiment

Point-Ahead System 1-1

Since the point-ahead solution depends on seeing the current aimpoint on the target, it is first necessary to get the current aimpoint on the target. FIG. 3 showed the current aimpoint behind the desired aimpoint on the target. If the point-ahead angle were larger, the source laser beam would have missed the target. Since the target is still being tracked, its angular velocity is known, but the linear velocity cannot be calculated from this without range information. However the direction of the target movement is known and the point-ahead angle is in that direction. An offset can be temporarily injected into either point-ahead servo loop (preferably the point-ahead servo loop −β of the output wave sensor) to point the source laser beam ahead until the current aimpoint shows up on the target. Here, an estimate of the range can be used to speed up the search. Once the current aimpoint is available, point-ahead tracking will close on the desired aimpoint, with no offset in the loops, as seen in FIG. 4.

A point-ahead system diagram is shown in FIG. 4. This is System 1-1. The physical aspects of this will be understood from FIG. 1 and are therefore not duplicated. Equations 8-17 define this system. The first item that has been added here, relative to FIG. 2, is the returned image of the current aimpoint, $T_R$, in the tracker T. The wavefront of this image as it enters the telescope (not the focal plane of the output wave sensor 23) is denoted by $W_R$. The wavefront of the image of desired aimpoint, $T_T$, in the tracker T, as it enters the telescope is denoted by $W_T$. The separation or difference in location between the images of the current aimpoint $T_R$ and the desired aimpoint $T_T$ ($T_R$-$T_T$) in the focal plane 7a of the tracker 7, Eqn. 9, drives the steering mirror ($R_C$) 19 in the common path 3b (FIG. 1) to put the image of the current aimpoint $T_R$ on the image of the desired aimpoint $T_T$ in the focal plane of the tracker, and the separation or difference in location between the images of the desired aimpoint $T_T$ and the marker reference $T_M$ ($T_M$-$T_T$) in the focal plane 7a of the tracker 7, Eqn. 8, drives the marker leg steering mirror $R_M$ (17) to align the marker laser beam along the received target image direction.

$$R_M = -\alpha(T_M - T_T) \quad\quad 8$$

$$R_C = -\beta(T_R - T_T) \quad\quad 9$$

$$T = M \quad\quad 10$$

$$M + R_M + N + C + R_C = W_M \quad\quad 11$$

$$T_T + R_M + N + C + R_C = W_T \quad\quad 12$$

$$H + C + R_C = W_H \quad\quad 13$$

$$T_R + R_M + N + C + R_C = W_R \quad\quad 14$$

$$W_R = W_H - \theta \quad\quad 15$$

$$\theta = 2\frac{v}{c} \quad\quad 16$$

$$W_H - (W_T + \theta) = W_R - W_T = H\frac{1}{1+\beta} + C\frac{1}{1+\beta} - W_T\frac{1}{1+\beta} - \theta\frac{1}{1+\beta} \quad\quad 17$$

TABLE IV

| $W_H - (W_T + \theta)$ | H | M, N | C | $W_T$ | θ |
|---|---|---|---|---|---|
| LOW FREQ. β >> 1 | $\frac{1}{\beta}$ | 0 | $\frac{1}{\beta}$ | $-\frac{1}{\beta}$ | $-\frac{1}{\beta}$ |
| HIGH FREQ. β << 1 | 1 | 0 | 1 | −1 | −1 |

The angle θ is the point-ahead angle, which is just dependent on target velocity. There are two new equations, Eqn. 14 for following the returned current aimpoint wavefront image $W_R$ through the system, and Eqn. 15 expressing the (point-ahead) difference in directions between the wavefront $W_H$ of the transmitted source laser beam and the wavefront $W_R$ of the returned current aimpoint beam, from the latter of which the image of the current aimpoint $T_R$ in the tracker is developed. The pointing error to be calculated here is the difference between the direction of the transmitted source laser beam represented by $W_H$ and the current point-ahead direction, which latter is expressed as the received desired aimpoint direction, wavefront $W_T$, plus the point-ahead angle θ, ($W_T$+θ), Eqn. 17. In controlling the steering mirrors, the output wave sensor signals are not used (but they can be used to calculate the range), and both of the mirror controls $R_C$ and $R_M$ are from the tracker, Eqns. 8 and 9; however, the α loop is only used to align the marker laser beam with the received target image and so has no direct effect on the pointing error.

(It does affect the accuracy of wavefront correction, which will affect the pointing error.) The β loop signal is partly derived from the dim received target image $T_T$ and so is signal limited and will have a low bandwidth. In addition, the speed of the β loop is limited by the round trip transit time of the light to the target and back (and even longer if the tracker is looking at the thermal hotspot instead of the reflected laser source beam light). How low and high frequency jitter components become pointing errors is also evident from Eqn. 17. Table IV gives the coefficients for the terms of Eqn. 17 for both the low frequency and high frequency components.

Just as tracking in the prior art, FIGS. 1 and 2, could be done by any of six system configurations, FIG. 4 does not represent the only way to implement the point-ahead function. Again, there are three legs available for steering and two control lines for the servo loops, but now there are three images in the tracker to drive the two servo loops, which gives three drive combinations, for a total of eighteen system configurations. Of all of these systems, System 1-1 is the presently preferred system.

It also might seem that since the three tracker images are being driven to coincidence, it would not matter which two of the three pairs was used. It matters for two reasons: first, the form of the equations is changed slightly and the resulting coefficients are different; second, the target image is of low bandwidth because of a low signal level, but the current aimpoint image is of low bandwidth because of the round trip transit time, so the bandwidths of the signals are different.

Finally, the wavefront correctors. The output wave sensor 23 senses the source laser beam wavefront $W_H$ and can feed back in a wavefront correction loop to a deformable mirror 19a on the telescope primary (or in the common path 3b). The output wave sensor also senses the marker laser beam wavefront $W_M$ in the target image direction and can feed back in a wavefront correction loop to a deformable mirror 17a in the marker leg 2. The wavefront correction loops are denoted by the curved dotted lines. Again, with two deformable mirrors to be put into three legs and with two control lines, there are six arrangements of the deformable mirrors. All of these work, but the one illustrated here is the most desirable from the view-point of optical considerations.

First Embodiment

Point-Ahead System 1-2

Figure 5:
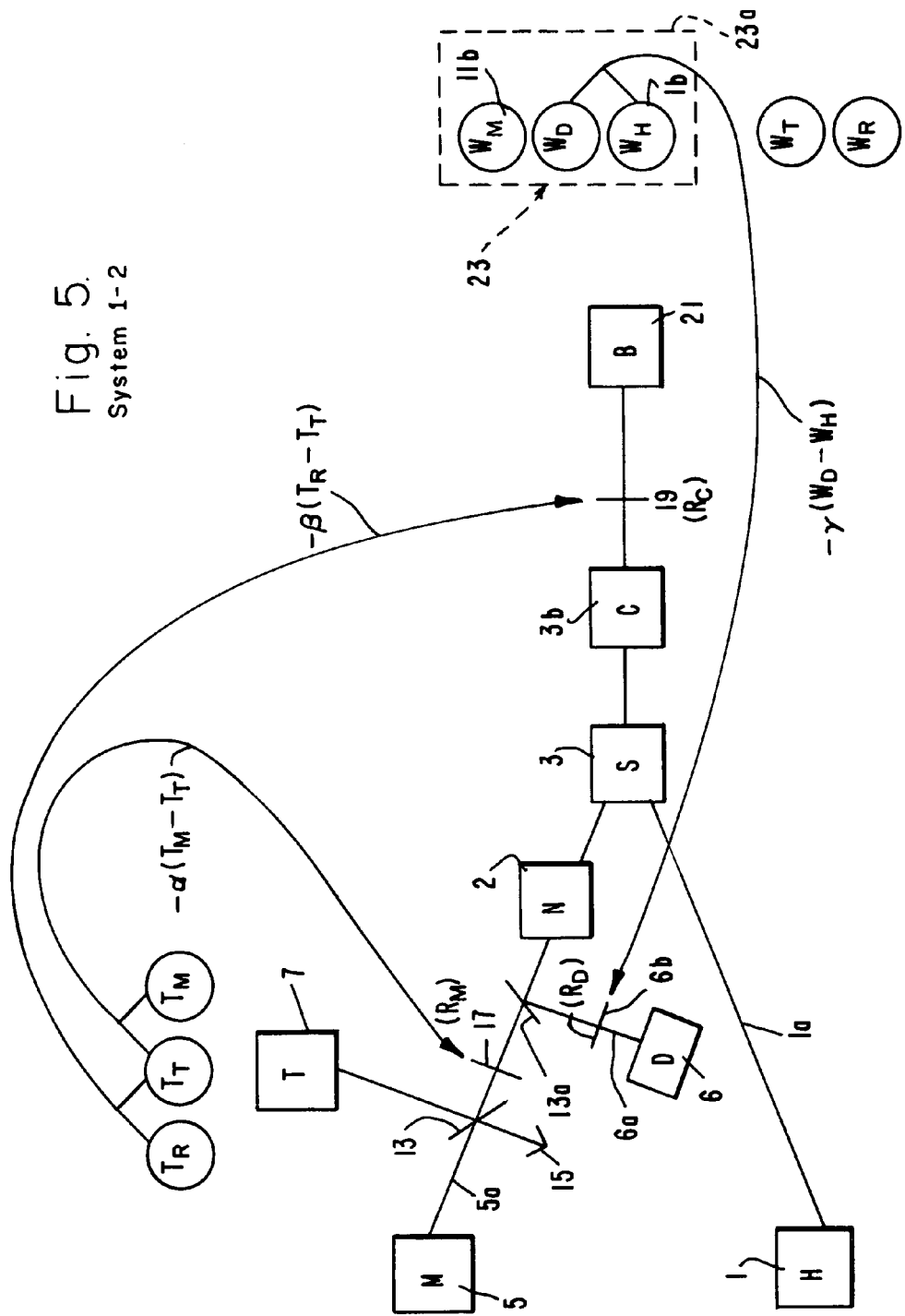
FIG. 5 is a block diagram of a second point-ahead system (System 1-2) showing a second implementation of the first embodiment of this invention.

FIG. 5 shows the second implementation of the first embodiment of this invention, which adds a designator laser beam 6a from a laser source 6 (D) and servos it into coalignment with the source laser beam 1a by means of a servo-controlled mirror 6b that couples the beam 6a into the marker leg 2. The reference character $T_R$ again represents the current aimpoint image in the focal plane of the tracker, but is now designated by the designator laser beam 6a (D). The wavefront correction needed for the designator laser beam 6a (D) is not the same as needed for the laser marker 5a (M) because it is looking in a different direction in the field-of-view of the telescope 21. The information carried by the designator laser beam 6a (D) and the marker laser beam 5a (M) are kept separate in the output wave sensor 23 by modulating these beams at different frequencies. The alternative to this is to make a three-color output wave sensor. The three deformable mirrors 17a, 19a and 20a of FIG. 5a can be put in the same legs as their respective steering mirrors, but these are not unique positions.

Equations 18-28 below, define the system of FIG. 5 which is System 1-2.

$$R_M = -\alpha(T_M - T_T) \quad 18$$

$$R_C = -\beta(T_R - T_T) \quad 19$$

$$R_D = -\gamma'(W_D - W_H) \quad 20$$

$$M + R_M + N + C + R_C = W_M \quad 21$$

$$T_T + R_M + N + C + R_C = W_T \quad 22$$

$$H + C + R_C = W_H \quad 23$$

$$T_R + R_M + N + C + R_C = W_R \quad 24$$

$$D + R_D + N + C + R_C = W_D \quad 25$$

$$W_R = W_D - \beta \quad 26$$

$$\theta = 2\frac{v}{c} \quad 27$$

$$W_H - (W_T + \theta) = H\frac{1 + \beta + \gamma'}{(1 + \beta)(1 + \gamma')} + C\frac{1}{1 + \beta} + (D + N)\frac{\beta}{(1 + \beta)(1 + \gamma')} - W_T\frac{1}{1 + \beta} - \theta\frac{1}{1 + \beta} \quad 28$$

TABLE V

| $W_H - (W_T + \theta)$ | H | D, N | C | $W_T$ | θ |
|---|---|---|---|---|---|
| LOW FREQ. $\beta, \gamma' \gg 1$ | $\frac{1}{\beta} + \frac{1}{\gamma'}$ | $\frac{1}{\gamma'}$ | $\frac{1}{\beta}$ | $-\frac{1}{\beta}$ | $-\frac{1}{\beta}$ |
| HIGH FREQ. $\gamma' \gg 1$ $\beta \ll 1$ | 1 | $\frac{\beta}{\gamma'}$ | 1 | −1 | −1 |

In this group of equations, Eqn. 28 provides the solution for the pointing error $W_H-(W_T+\theta)$. There is one more equation, Eqn. 25, from following the designator laser beam 6a (D), and in Eqn. 26, the current aimpoint direction from wavefront $W_R$ is now related to the designator laser beam, using wavefront $W_D$, not the source laser beam, by the point-ahead angle. The γ' servo loop is a high-level, high bandwidth, local loop, while the β servo loop is a low-level, low bandwidth loop. Table V provides the high and low frequency coefficients for the terms of the pointing error Eqn. 28.

Figure 5A:
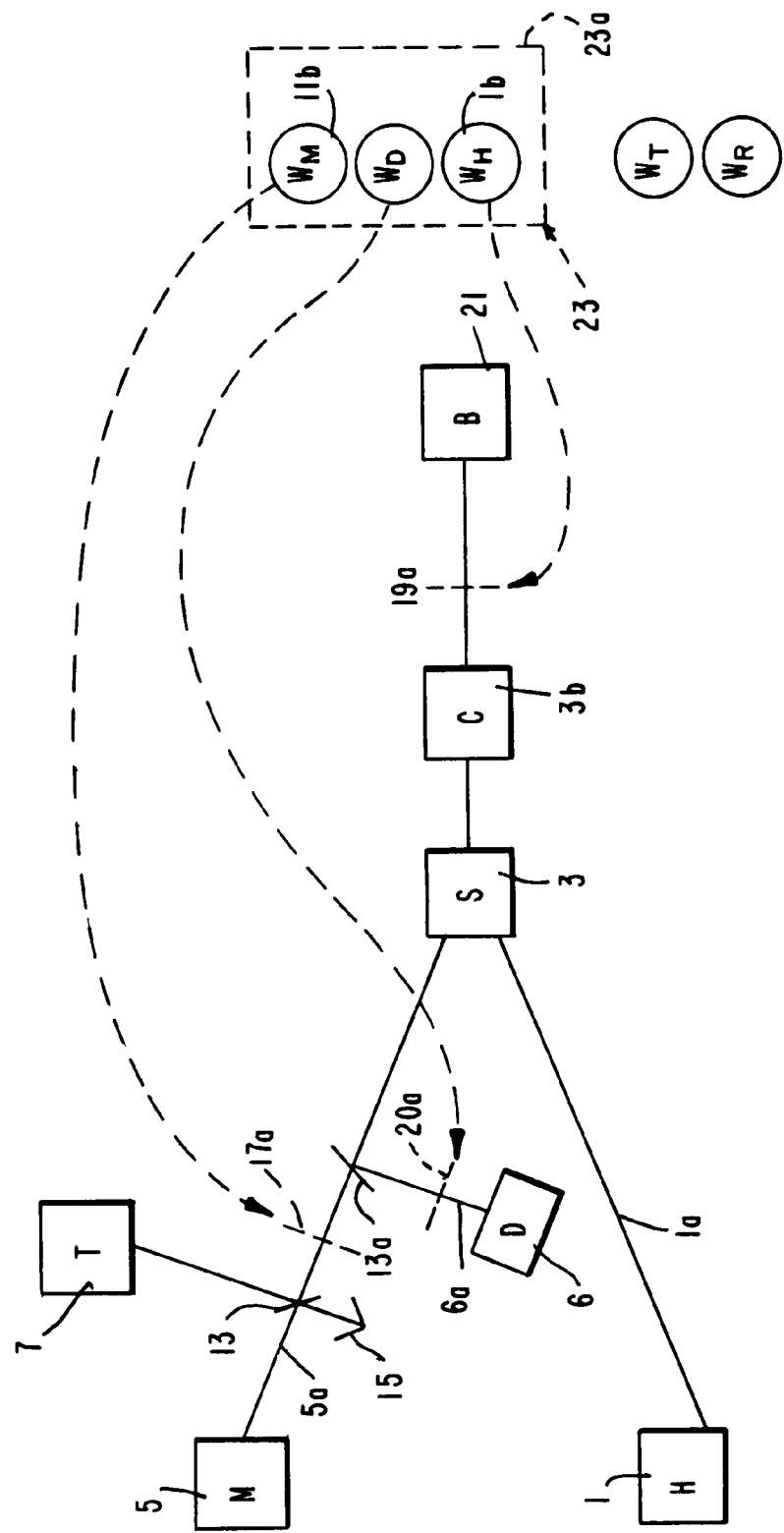
FIG. 5a illustrates the wavefront correction control loops of the system of FIG. 5.

Wavefront correction for the system of FIG. 5 is seen in FIG. 5a. The output wave sensor 23 senses the source laser beam wavefront $W_H$. Signals representing the wavefront aberration are employed in a wavefront correction loop to control the deformable mirror 19a on the telescope primary or in the common path 3b, as shown. The output wave sensor also senses the marker laser beam wavefront $W_M$ in the target image direction. Signals representing this wavefront aberration are used in a wavefront correction loop to control the deformable mirror 17a in the marker leg 2. The output wavefront sensor similarly senses the aberration on the designator beam $W_D$ and controls a deformable mirror 20a in the designator path. Again, these are not unique locations for the aberration correction devices. The wavefront correction loops are denoted by the curved dotted lines.

Second Embodiment

Prior Art

Figure 6:
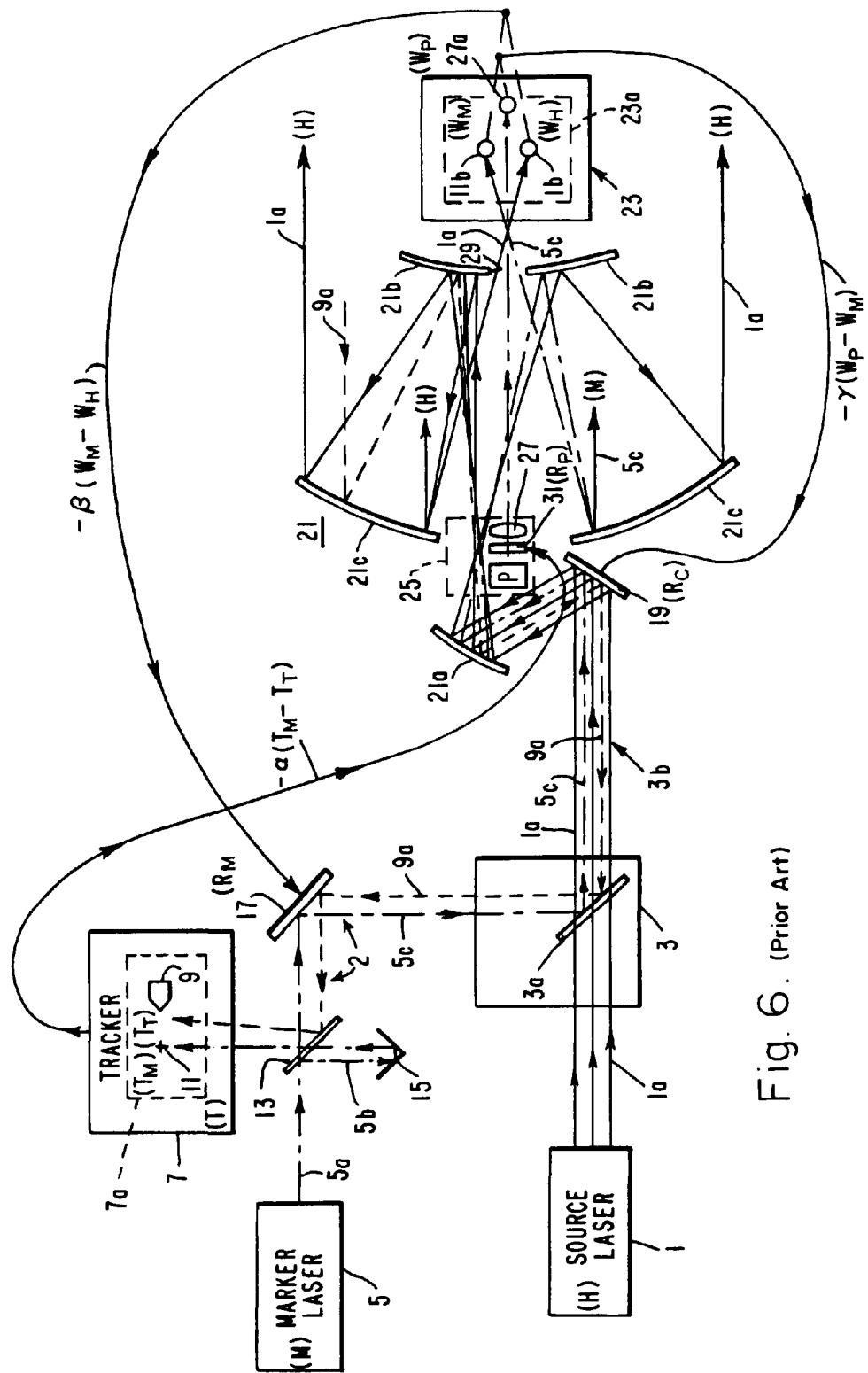
FIG. 6 is a prior art system similar to FIG. 1 to which a stable platform has been added and a stabilized vertex lens is added in the hole in the primary mirror of the tracker telescope.

FIG. 6 shows a prior art, inertially stabilized platform reference, laser pointer-tracker without point-ahead capability. A mathematical analyses, Eqns. 29-37, of this prior art system and related Tables VI, VII and VIII are presented below. This prior art system is similar to that of FIG. 1, but with a stable platform 25 and a vertex lens 27 added in the hole 29 in the primary mirror assembly 21a-21c. The tracker output signal ($T_M$-$T_T$), which in the non-stable, platform system of FIG. 1 was used to drive the mirror 19 in the common path 3b, is now coupled to drive a mirror 31 on the stable platform 25 to point the laser beam from a separate laser P on the stable platform 25, onto the focal plane 23a of the output wave sensor 23, Eqn. 30. The locations of the stable platform beam spot 27a ($W_P$) and the transmitted marker laser beam spot 11b ($W_M$), in the focal 23a plane of the output wave sensor 23, are then compared and their difference ($W_P$-$W_M$) is used to drive the mirror 19 in the common path 3b, Eqn. 31.

Figure 7:
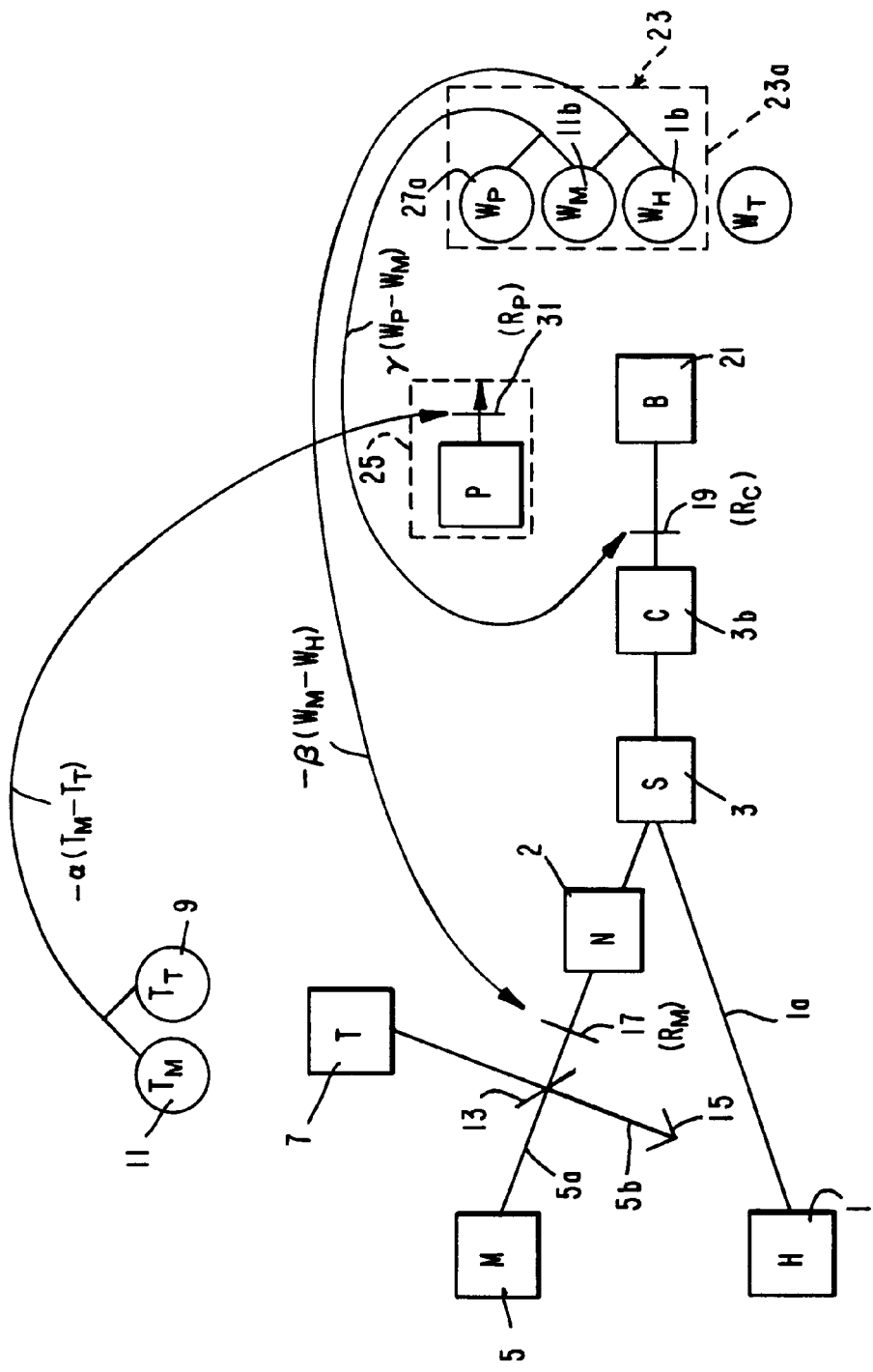
FIG. 7 is a schematic representation of the function of the system of FIG. 6.

FIG. 7, the functional counterpart of prior art FIG. 6, again contains all the essential features of the system of FIG. 6. Here, as in FIG. 1, the elements of FIG. 7 corresponding to the devices of FIG. 6 are identified by the reference characters of FIG. 6 adjacent thereto. In this FIG. 7, P represents the separate laser on the stable platform 25; ($R_P$) represents the mirror 31 on the stable platform 25, and $W_P$ is the stable beam spot 27a as sensed at the focal plane 23a of the output wave sensor 23. The difference between the directions of the stable beam P and the marker beam 5c, (M) determined from the locations of the beam spots $W_P$ and $W_M$, is multiplied by the loop gain $-\mathscr{r}$ and applied to the beam steering mirror 19 ($R_C$) in the common path 3b, Eqn. 31. (Since images $W_P$, $W_M$, and $W_H$, are all being driven to coincidence, any of the three ways they can be compared pairwise can be used with only minor effects on the final result.) Any jitter in the system will be detected by these high signal level, high bandwidth comparisons with the stable platform beam P and can be served out, without relying on the tracker signal.

$$R_M = -\beta(W_M - W_M) \quad\quad 29$$

$$R_P = -\alpha(T_M - T_T) \quad\quad 30$$

$$R_C = -\mathscr{r}'(W_P - W_M) \quad\quad 31$$

$$T_M = M \quad\quad 32$$

$$P + R_P = W_P \quad\quad 33$$

$$M + N + R_M + C + R_C = W_M \quad\quad 34$$

$$T_T + N + R_M + C + R_C = W_T \quad\quad 35$$

$$H + C + R_C = W_H \quad\quad 36$$

$$W_H - W_T = H\frac{1+\alpha\gamma'+\gamma'+\beta\gamma'}{(1+\alpha\gamma'+\gamma')(1+\beta)} - (M+N)\frac{\alpha\gamma'+\gamma'}{(1+\alpha\gamma'+\gamma')(1+\beta)} + \quad 37$$

$$C\frac{1}{1+\alpha\gamma'+\gamma'} - W_T\frac{1+\gamma'}{1+\alpha\gamma'+\gamma'} + P\frac{\gamma'}{1+\alpha\gamma'+\gamma'}$$

TABLE VI

| $W_H$-$W_T$ | H | M,N | C | $W_T$ | P |
|---|---|---|---|---|---|
| | $\dfrac{1+\alpha\gamma'+\gamma'+\beta}{(1+\alpha\gamma'+\gamma')(1+\beta)}$ | $\dfrac{-(\alpha\gamma'+\gamma')}{(1+\alpha\gamma'+\gamma')(1+\beta)}$ | $\dfrac{1}{1+\alpha\gamma'+\gamma'}$ | $\dfrac{-(1+\gamma')}{(1+\alpha\gamma'+\gamma')}$ | $\dfrac{\gamma'}{1+\alpha\gamma'+\gamma'}$ |

TABLE VII

LOW FREQUENCY FOURIER COMPONENTS

| $W_H$-$W_T$ | H | M , N | C | $W_T$ | P |
|---|---|---|---|---|---|
| $\alpha,\beta,\mathscr{r}\gg 1$ | $\dfrac{1}{\alpha\gamma'}+\dfrac{1}{\beta}$ | $-\dfrac{1}{\beta}$ | $\dfrac{1}{\alpha\gamma'}$ | $-\dfrac{1}{\alpha}$ | $\dfrac{1}{\alpha}$ |

TABLE VIII

HIGH FREQUENCY FOURIER COMPONENTS

| $W_H$-$W_T$ | H | M,N | C | $W_T$ | P |
|---|---|---|---|---|---|
| $\beta,\mathscr{r}\gg 1$ $\alpha\ll 1$ | $\dfrac{1}{\gamma'}+\dfrac{1}{\beta}$ | $-\dfrac{1}{\beta}$ | $\dfrac{1}{\gamma'}$ | $-1$ | $1$ |

The changes reflected in the mathematical analysis from prior art system FIG. 2, above, include first, the addition of mirror 31 on the stable platform 25, designated by $R_P$ in FIG. 7 and driven by the tracker signal as described above; second, changing the common path mirror 19 ($R_C$) to be driven by the difference between the directions of the stable beam $W_P$ and the marker beam $W_M$ as measured by the output wave sensor; and third, showing the stable beam spot $W_P$ in the output wave sensor 23, as the direction of the stable platform P plus the deviation of the steered platform mirror, $R_P$. This provides a new independent physical parameter, P, which represents the instabilities in the stable platform itself. These eight equations are then solved for the pointing error angle, ($W_H$-$W_T$), defined in detail in Eqn. 37.

Just as for non-stabilized systems, the optical diagrams of FIGS. 6 and 7 do not disclose the only way to connect the servo loops. Here again, there are six possible configurations and all involve stable platforms. The coefficients of the terms of the pointing error equation for FIGS. 6 and 7, Eqn. 37, are given in Table VI. Examination of the low frequency components, Table VII, shows that the loop gains are all large and the coefficients of the terms can be simplified, as shown in Table VII. The servo loops attenuate the disturbances from all sources to give accurate pointing.

At higher frequencies, only the gain of the tracker loop falls off. The other signals are high-level, local loops and can have wide bandwidths. At these higher frequencies, the value of $\alpha$ will become very small while the values of both $\beta$ and $\mathscr{r}$ remain large. The coefficients of the terms can be simplified under these conditions to give the high frequency results in Table VIII. High frequency real motions of the target show up as pointing errors, but compared to non-stable platform systems, jitters in the laser source beam, the marker beam, and the common paths no longer cause pointing errors. In exchange for this improvement, the pointing error becomes sensitive to high frequency jitters of the stable platform itself. That is the advantage of the stable platform system: The question is not how good can we build a stable platform, but which can we build more stable, a small stable platform or the whole optical system.

Additional and very important advantages of the stable platform system are that since the target image is stabilized on the tracker against all internal system jitters, the target image signal-to-noise ratio will be larger, dimmer or more distant targets can be detected, and the features of the image can be more readily discerned and the desired aimpoint more accurately determined.

Second Embodiment

Advantages

In the second embodiment of this invention to be described, two shared aperture, inertially stabilized platform reference, laser transmitter pointing and tracking systems, with independent wavefront correction for the transmitted laser and received target image, and that solve the point-ahead problem, are presented. The stable platform provides the same advantages for these point-ahead systems as it provides for non-point-ahead prior art systems: all system jitters are fully compensated without relying on the tracker to detect them; they are detected by local alignment loops and removed; the tracker only has to follow true target motion; the target image is stabilized on the tracker focal plane for an increased signal-to-noise ratio in the tracker.

The methods of solving the point-ahead problem, the choice between the two versions in any particular system, and the advantages of this second embodiment of the invention are the same as those of the first embodiment. Additionally, this embodiment of the invention provides reduced pointing errors resulting from the use of the inertially stabilized reference.

Second Embodiment

System 2-1

Just as for the improved non-stable-platform systems, System 1-1 and System 1-2, the point-ahead solution described here depends on seeing the current aimpoint on the target, and just as for the non-stable systems, the aimpoint is positioned on the target by adding a temporary offset into one of the pointing servo loops until the current aimpoint shows up on the target. This is described in connection with FIG. 4, above. Once the current aimpoint is available, the point-ahead tracking of System 2-1 will close on the desired aimpoint, with no offsets in the loops.

Figure 8:
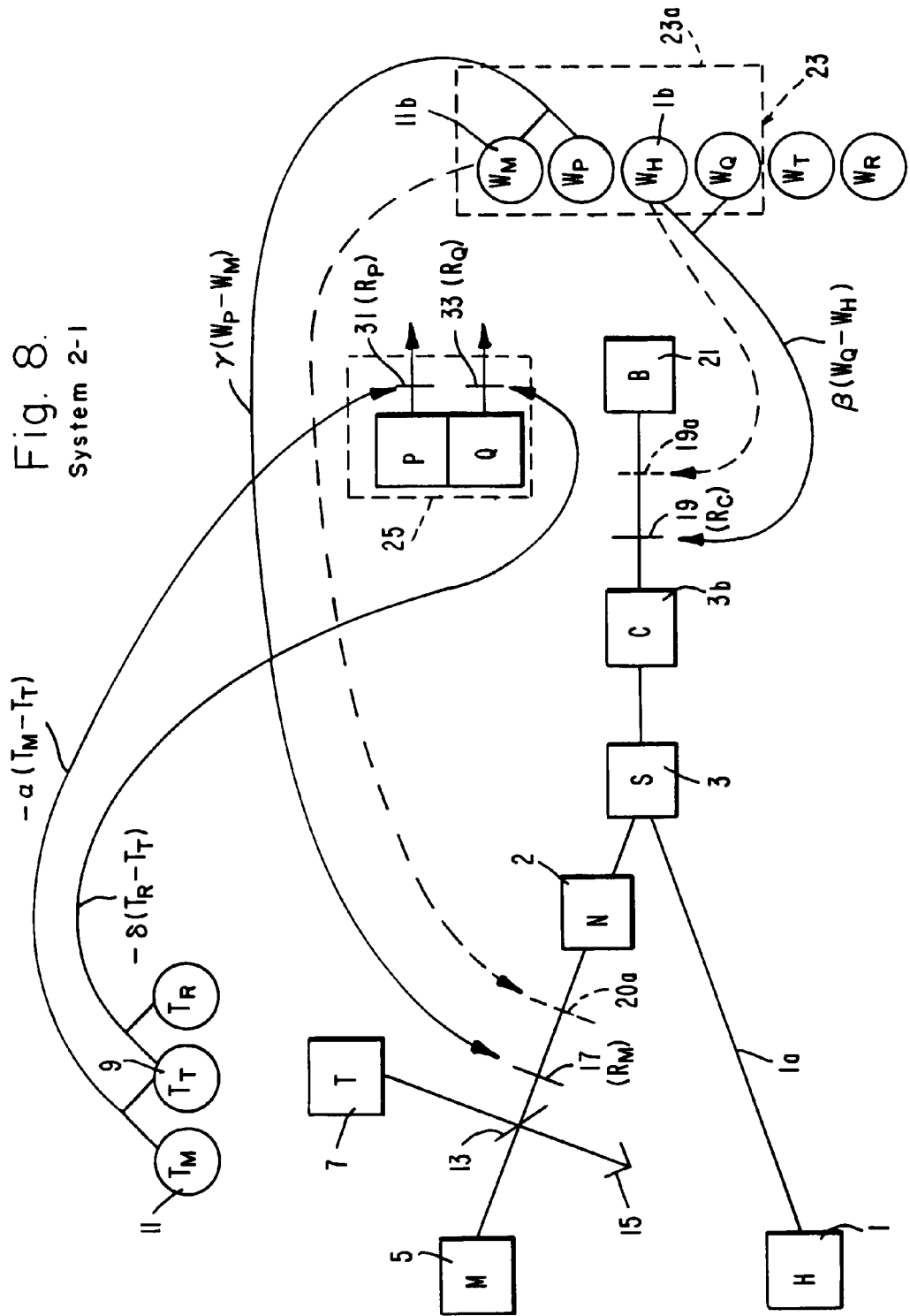
FIG. 8 is a block diagram of a first point-ahead system (System 2-1) showing a first implementation of the second embodiment of this invention.

System 2-1 shown in FIG. 8 is a stable platform, point-ahead system. Equations 38-50 for this system together with Table IX are presented below. What has been added for the point-ahead function, compared to the prior art FIGS. 6 and 7, is the returned image of the current aimpoint $T_R$ in the tracker and a second stable laser beam source, Q, and beam steering mirror, 32 ($R_Q$), on the stable platform. The locations in the focal plane 7a of the tracker 7 of the desired aimpoint 9 ($T_T$) and marker reference 11 ($T_M$), drive the steering mirror 31 ($R_P$) to point the beam of the stabilized platform 25 (P) in the direction of the received target image $W_T$, Eqn. 39, and the locations in the focal plane 7a of the tracker of the current aimpoint $T_R$ and the desired aimpoint 9 ($T_T$) drive the stabilized beam Q to point in the point-ahead direction, Eqn. 40. The $\gamma$ servo, controlled by the signal ($W_P - W_M$) of the output wave sensor 23, then drives the marker beam 5c (M) in the direction of the stabilized platform beam P, Eqn. 41, and the β servo, controlled by the signal ($W_Q - W_H$) of the output wave sensor 23, drives the source laser beam 1a (H) in the direction of the stabilized beam Q, Eqn. 38. The stabilized beams P and Q can be identified in the output wave sensor 23 by modulating them at different frequencies.

$$R_C = \beta(W_Q - W_M) \qquad 38$$

$$R_P = -\alpha(T_M - T_T) \qquad 39$$

$$R_Q = -\delta(T_R - T_T) \qquad 40$$

$$R_M = \gamma(W_P - W_M) \qquad 41$$

$$M + R_M + N + C + R_C = W_M \qquad 42$$

$$T_T + R_M + N + C + R_C = W_T \qquad 43$$

$$H + C + R_C = W_H \qquad 44$$

$$T_R + R_M + N + C + R_C = W_R \qquad 45$$

$$W_Q = Q + R_Q \qquad 46$$

$$W_P = P + R_P \qquad 47$$

$$W_R = W_H - \theta \qquad 48$$

$$T_M = M \qquad 49$$

$$W_H - (W_T + \theta) = H\frac{1}{1+\beta+\beta\delta} + C\frac{1}{1+\beta+\beta\delta} + Q\frac{\beta}{1+\beta+\beta\delta} - W_T\frac{1+\beta}{1+\beta+\beta\delta} - \theta\frac{1+\beta}{1+\beta+\beta\delta} \qquad 50$$

TABLE IX

| $W_H - (W_T + \theta)$ | H | M,N | C | P | Q | $W_T$ | θ |
|---|---|---|---|---|---|---|---|
| LOW FREQ. β,δ ≫ 1 | $-\frac{1}{\beta\delta}$ | 0 | $-\frac{1}{\beta\delta}$ | 0 | $-\frac{1}{\delta}$ | $-\frac{1}{\delta}$ | $\frac{1}{\delta}$ |
| HIGH FREQ. β ≫ 1 δ ≪ 1 | $\frac{1}{\beta}$ | 0 | $\frac{1}{\beta}$ | 0 | 1 | −1 | −1 |

In this group of equations, there are additional equations that define the servo control of the mirrors $R_P$ and $R_Q$, Eqns. 39 and 40; for the directions of the beams P and Q reflected from their mirrors, Eqns. 46 and 47; for following the returned current aimpoint image $T_R$ in the focal plane of the tracker through the system, Eqn. 45; and for expressing the point-ahead difference in directions between the transmitted source laser beam and the returned current aimpoint beam, Eqn. 48. The solution of these equations for the pointing error $W_H - (W_T + \theta)$, defined by Eqn. 50, has contributions from not only disturbances in the laser source beam H, the marker laser beam M, the common paths 2 and 3b, target location, and stable platform beam P, but now also from the stabilized beam Q and the point-ahead angle 9.

The α loop is of low bandwidth because the target image $T_T$ in the tracker is dim and the δ loop is limited by the round trip transit time, so these two gains roll off in frequency before the high-level, local loop, β and $\mathcal{r}'$ gains. How low and high frequency jitter components become pointing errors is seen in Table IX. By comparing this system, System 2-1, with System 1-1, it is clear that this stable platform point-ahead system retains all the advantages of the stable platform: all internal system jitters are removed by the stable platform loops and do not rely on the track loop, and the target image is stabilized on the tracker against all internal system jitters.

As noted above, there are six possible configurations of the stable platform prior art system of FIG. 6. All six of these non-point-ahead, stable platform systems can be converted to point-ahead systems in the same manner by adding a stable platform beam Q driven by the returned current aimpoint image. Also, there are three tracker images being driven into coincidence. These are the target image desired aimpoint $T_T$, the reference marker laser beam image $T_M$, and the returned current aimpoint image $T_R$. Any two of the three pairwise comparisons can be used to drive the α and δ servo loops for a total of eighteen systems. These are not developed here in the interest of simplicity, however the combinations are easily realized.

Attention is directed to the fact that the current aimpoint image $T_R$ in the tracker focal plane is directly compared to the desired aimpoint image $T_T$ rather than to the marker reference image $T_M$. Then the pointing error becomes independent of those elements that follow the target image. These elements are the elements involving the characteristics M, N, P, and the servo loop gains α and $\mathcal{r}'$. In exchange, the δ servo loop, driven by the difference in location of the desired and current aimpoints $T_T$ and $T_R$, is further limited in bandwidth because both of its sources $T_T$ and $T_R$ are of low bandwidth. Whether or not this choice among the eighteen combinations available to form System 2-1 is optimal depends on the particular circumstances.

Since the stabilized beam P now has no direct effect on the pointing accuracy, consideration might be given to eliminating it and driving the mirror $R_M$ directly with the signal in the α loop, thereby converting the α servo loop into an unstabilized tracker. But the stabilized beam P does more than just stabilize the marker beam M that senses the wavefront correction needed in the target image path; it also stabilizes the target image $T_T$ in the tracker, not only against jitters in the beams M and N, but also against jitters in the laser source beam H that are taken out in the common leg 3b by the β servo loop, Eqn. 38, and thereby added to target image jitter. Without the stabilized beam P to stabilize the tracker image, this spreads out the target and the information in the returned beam $T_R$, which reduces the signal-to-noise ratio and the image quality.

Figure 8A:
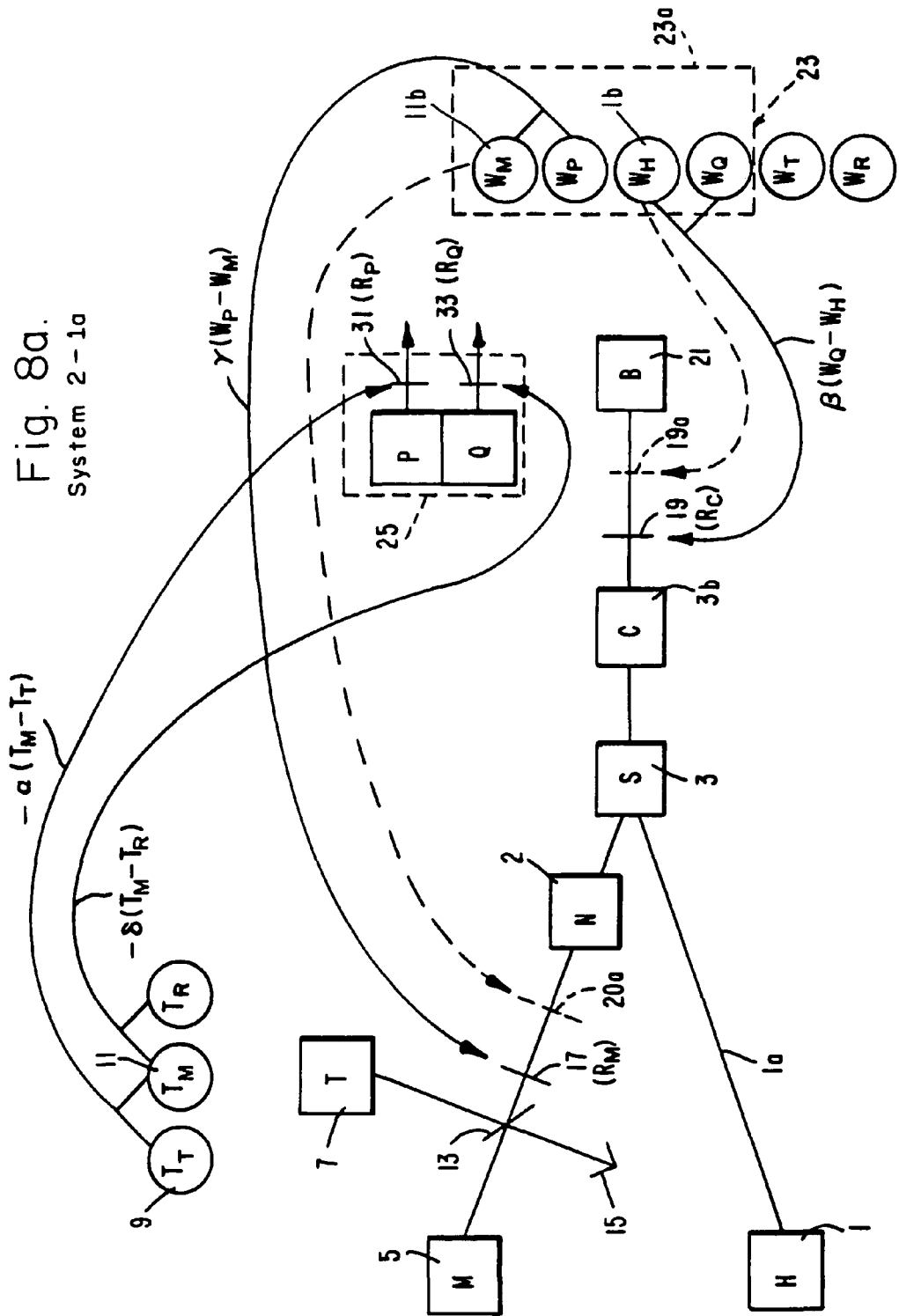
FIG. 8a is a variation of FIG. 8.

FIG. 8a presents a modification of FIG. 8. In FIG. 8a for comparison purposes, the signals from the locations of the two tracker images $T_T$ and $T_R$ are compared to the signal derived from the marker tracker image $T_M$, whereas in FIG. 8 the signals of images $T_M$ and $T_R$ are compared to the signal of tracker $T_T$. These differences are apparent in comparing Eqns. 39 and 40, above, for FIG. 8, and Eqns. 52 and 53, below, for FIG. 8a.

$$R_C = \beta(W_Q - W_H) \qquad 51$$

$$R_P = -\alpha(T_M - T_T) \qquad 52$$

$$R_Q = -\delta(T_M - T_R) \qquad 53$$

$$R_M = \mathcal{r}'(W_P - W_M) \qquad 54$$

$$M + R_M + N + C + R_C = W_M \qquad 55$$

$$T_T + R_M + N + C + R_C = W_T \qquad 56$$

$$H + C + R_C = W_H \qquad 57$$

$$T_R + R_M + N + C + R_C = W_R \qquad 58$$

$$W_Q = Q + R_Q \qquad 59$$

$$W_P = P + R_P \qquad 60$$

$$W_R = W_H - \theta \qquad 61$$

$$T_M = M \qquad 62$$

$$W_H - (W_T + \theta) = \qquad 63$$
$$H\frac{1 + \beta\delta + \alpha\gamma' + \gamma'}{A} - (M+N)\frac{\beta\delta}{A} + C\frac{1 + \alpha\gamma' + \gamma'}{A} - P\frac{\beta\gamma'\delta}{A} +$$
$$Q\frac{\beta(1 + \alpha\gamma' + \gamma')}{A} - W_T\frac{1 + \beta + \gamma' - \beta\gamma'\delta + \gamma'\beta + \alpha\gamma' + \alpha\beta\gamma'}{A} -$$
$$\theta\frac{1 + \beta\delta + \beta + \gamma' + \gamma'\beta + \alpha\gamma' + \alpha\beta\gamma'}{A}$$

$$A = 1 + \beta + \mathcal{r}' - \beta\mathcal{r}' \; \delta + \mathcal{r}' \; \beta + \alpha\mathcal{r}' \; \alpha\beta\mathcal{r}' - \alpha\beta\mathcal{r}' \; \delta \qquad 64$$

TABLE X

| | H | M,N | C | P | Q | $W_T$ | θ |
|---|---|---|---|---|---|---|---|
| LOW FREQ. $\alpha,\beta,\mathcal{r}',\delta \gg 1$ | $-\left(\frac{1}{\alpha\gamma'} + \frac{1}{\beta\gamma'}\right)$ | $-\frac{1}{\alpha\gamma'}$ | $-\frac{1}{\beta\delta}$ | $\frac{1}{\alpha}$ | $-\frac{1}{\delta}$ | $\frac{1}{\delta} - \frac{1}{\alpha}$ | $\frac{1}{\alpha\gamma'} + \frac{1}{\delta}$ |
| HIGH FREQ. $\beta,\mathcal{r}' \gg 1$ $\alpha,\delta \ll 1$ | $\frac{1}{\beta}$ | | $-\frac{\delta}{\gamma'}$ | $\frac{1}{\beta}$ | $-\delta$ | 1 | $-1$ | $-1$ |

Equations 51 through 64 define the system of FIG. 8a. The equation defining the pointing error is Eqn. 63. Table X defines the low frequency and high frequency co-efficients for the terms of Eqn. 63.

With respect to wavefront correction in both FIGS. 8 and 8a, the output wave sensor 23 senses the aberrations of the wavefront $W_H$ of the laser source beam 1a (H) and feeds back in a wavefront correction loop to a deformable mirror 19a on the primary, or in the common path 3b. The output wave sensor 23 also senses aberrations in the marker beam wavefront $W_M$ in the target image direction and feeds back in a wavefront correction loop to a deformable mirror 20a in the marker leg. Again, with two deformable mirrors to be put into three legs and with two control servo loops, there are other arrangements of the deformable mirrors that work, but this one is the most desirable from optical considerations.

Second Embodiment

System 2-2

Figure 9:
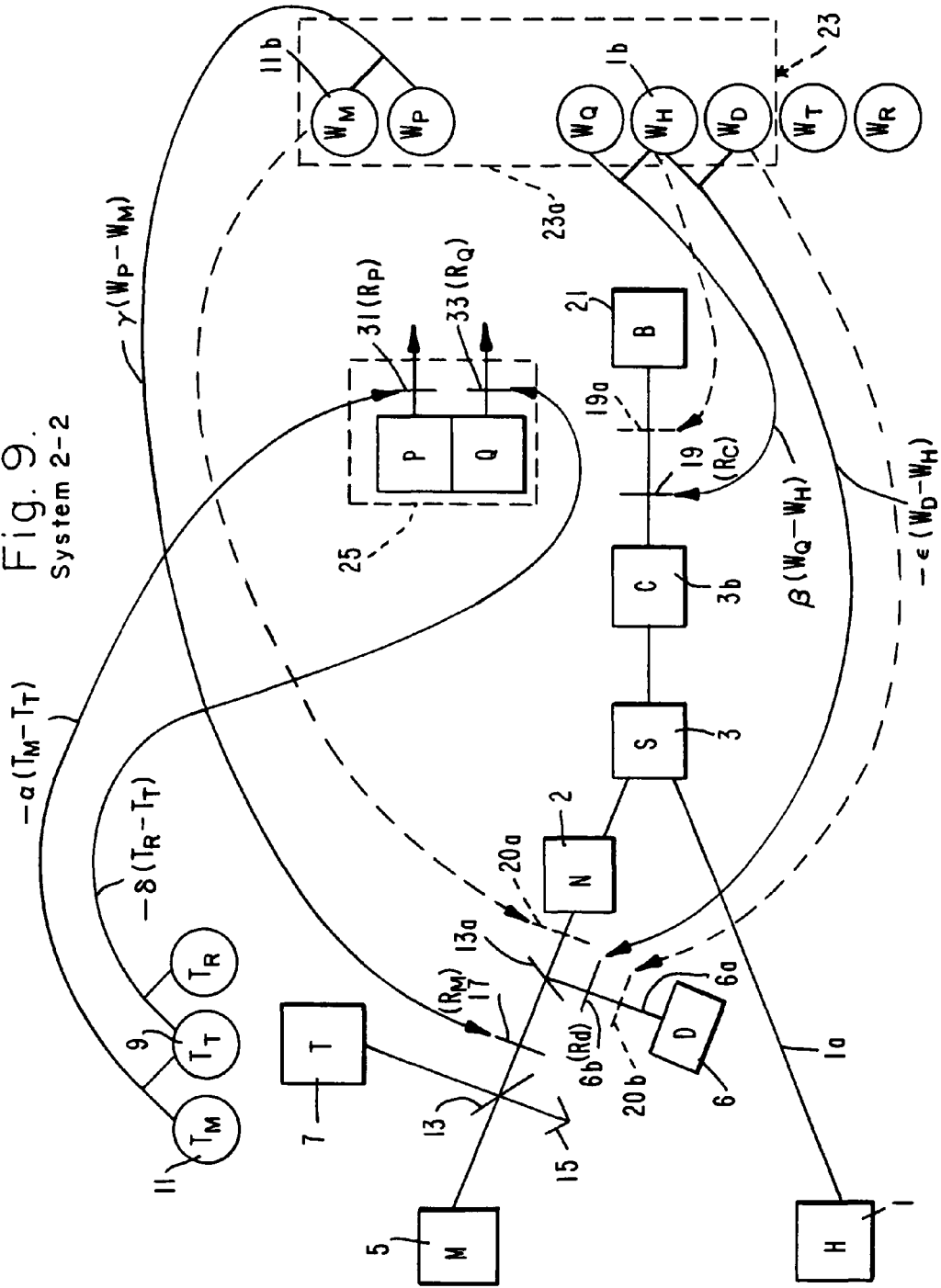
FIG. 9 is a block diagram of a second point-ahead system (System 2-2) showing a second implementation of the second embodiment of this invention.

FIG. 9 shows the second implementation of the second embodiment of this invention, System 2-2, which adds a designator laser D and servos the designator laser beam into coalignment with the laser source beam 1a (H). Equations 65-80, which define the system, are presented below. The stabilized laser beams Q and P, the marker laser beam M, and the source laser beam H are steered by their beam steering mirrors in the δ, α, $\tau$ and β servo loops, Eqns. 67, 66, 68 and 65, respectively, in the same manner as shown for System 2-1. Wavefront correction for corresponding wavefronts is also the same. The wavefront correction needed for the designator beam D, however, is not the same as needed for the marker laser beam 5a (M) because it is looking in a different direction in the field-of-view of the telescope 21. The information in the laser beams D and M is kept separate in the output wave sensor 23 by modulating them at different frequencies. The three deformable mirrors 20b, 19a and 20a for the D, H, and M (or T) paths, respectively, can be put in the same legs as the respective steering mirrors controlled by the pointing loops, but again, these are not unique positions. These mirrors are in wavefront correction loops denoted by the dotted lines and, respectively, are controlled by signals derived from the wavefront images $W_D$, $W_H$ and $W_M$ in the focal plane 23a of the output wave sensor 23.

$$R_C = \beta(W_Q - W_H) \quad (65)$$

$$R_P = -\alpha(T_M - T_T) \quad (66)$$

$$R_Q = -\delta(T_R - T_T) \quad (67)$$

$$R_M = \tau(W_P - W_M) \quad (68)$$

$$R_D = -\epsilon(W_D - W_H) \quad (69)$$

$$M + R_M + N + C + R_C = W_M \quad (70)$$

$$T_T + R_M + N + C + R_C = W_T \quad (71)$$

$$H + C + R_c = W_H \quad (72)$$

$$T_R + R_M + N + C + R_C = W_R \quad (73)$$

$$D + R_D + N + C + R_C = W_D \quad (74)$$

$$W_Q = -Q + R_Q \quad (75)$$

$$W_P = P + R_P \quad (76)$$

$$W_R = W_D - \theta \quad (77)$$

$$T_M = M \quad (78)$$

$$W_H - (W_T + \theta) = \quad (79)$$

$$-H\left(\frac{1 + \epsilon + (\alpha\gamma' + \gamma')(1 + \epsilon - \beta\delta)}{A}\right) + M\frac{(1 + \epsilon)(\alpha\gamma' + \gamma')}{A} +$$

$$N\frac{(\alpha\gamma' + \gamma')(1 + \epsilon - \beta\delta)}{A} - D\frac{\beta\delta(\alpha\gamma' + \gamma')}{A} -$$

$$C\frac{1 + \epsilon}{A} - P\frac{\gamma'(1 + \epsilon)}{A} + Q\frac{(\alpha\gamma' + \gamma')\beta(1 + \epsilon)}{A} -$$

$$W_T \frac{\alpha\beta\gamma' \epsilon + \alpha\beta\gamma' + \beta\gamma' \epsilon + \beta\gamma' - \gamma' \epsilon - \gamma' - \epsilon - 1}{A} -$$

$$\theta \frac{\alpha\beta\gamma' \epsilon + \alpha\beta\gamma' + \beta\gamma' \epsilon - \alpha\gamma' \epsilon - \alpha\gamma' + \beta\delta - \gamma' \epsilon - \gamma' - \epsilon - 1}{A}$$

$$A = \alpha\beta\tau\delta\epsilon + \beta\tau\delta\epsilon + \alpha\beta\tau\epsilon + \alpha\beta\tau\delta + \alpha\beta\tau + \beta\tau\epsilon - \alpha\tau\epsilon + \beta\tau\delta - \alpha\tau + \beta\tau - \tau\epsilon - \tau - \epsilon - 1 \quad (80)$$

TABLE XI

| | H | M | N | D | C | P | Q | $W_T$ | θ |
|---|---|---|---|---|---|---|---|---|---|
| LOW FREQ. α,β$\tau$,δ,ϵ >> 1 | $\frac{1}{\epsilon} - \frac{1}{\beta\delta}$ | $\frac{1}{\beta\delta}$ | $\frac{1}{\beta\delta}$ | $-\frac{1}{\epsilon}$ | $\frac{1}{\epsilon}$ | $-\frac{1}{\alpha\beta\gamma'\delta}$ | $-\frac{1}{\alpha\beta\delta}$ | $\frac{1}{\delta}$ | $-\frac{1}{\delta}$ | $-\frac{1}{\delta}$ |
| HIGH FREQ. β,$\tau$,ϵ >> 1 α,δ << 1 | $-\frac{1}{\beta}$ | $\frac{1}{\beta}$ | $\frac{1}{\beta}$ | $-\frac{\delta}{\epsilon}$ | $-\frac{1}{\beta\gamma'}$ | $-\frac{1}{\beta}$ | | 1 | -1 | -1 |

There is one more equation, Eqn. 74, from following the D beam. The current aimpoint direction, $W_R$, is now related to the designator beam, $W_D$, not $W_H$, Eqn. 77, by the point-ahead angle θ. The ϵ loop is a high-level, high bandwidth, local loop. Equation 79 defines the pointing error. Table XI provides the low frequency and high frequency coefficients for the terms of the pointing error. It is evident from FIG. 9, from the equations relating thereto, and from Table XI how low and high frequency disturbances propagate into pointing errors. Again, all the advantages of the stable platform are preserved.

As noted above, the output wave sensor 23 now also senses the wavefront $W_D$ of the designator beam D. This information is then used in a wavefront correction loop to control a deformable mirror 20b in the path of the designator laser beam D.

Third Embodiment

Prior Art

FIG. 10 shows a prior art type of separate aperture, inertially stabilized platform reference, laser pointer-tracker without point-ahead capacity. Equations 81-90 define the prior art system of FIG. 10 and Table XII provides the low and high frequency coefficients for the terms of the pointing error equation, Eqn. 90. In FIG. 10, parts corresponding to parts in earlier figures have the same reference characters. A separate transmitter beam expander 21d and a separate receiver beam expander 21e are employed. These are respectively coupled to the source laser 1 and to the marker laser 5. Only one stable platform 25 is used, on the transmitter. A portion P of the stable laser beam Q is piped over to the receiver 21e via a periscope 35 (G). (Periscopes can translate a beam without deviating the direction of propagation, regardless of any rigid body motion of the periscope itself.) The image $W_P$ of the stable beam P in the focal plane of the output wave sensor 23c of the receiver is used to stabilize the receiver line of sight on the received target image desired aimpoint 9 ($T_T$) in the focal plane of the tracker 7. This stable beam direction ρ is also transferred to the transmitter 21d by the periscope 35 and used to stabilize the transmitter line of sight. As in the earlier examples, the marker laser 5 is coupled to the tracker 7 via the beam splitter 13 and the corner cube 15 to provide the reference marker image 11 ($T_M$). The output of the beam splitter 13 is now coupled via the steering mirror 17 to the receiver beam expander 21e. The α servo loop, responsive to the difference of the signals from the marker reference image $T_M$ and desired aimpoint image $T_T$ in the tracker 7, Eqn. 83, controls a beam steering mirror 33 in the stable platform optics. The β servo loop, responsive to the difference of the signals from the wavefront images $W_Q$, $W_H$, in the output wave sensor 23b, Eqn. 82, controls a beam steering mirror 37, coupling the source laser beam to the transmitter beam expander 21d. The γ servo loop, responsive to the difference of the signals from the marker image $W_M$ and the image $W_P$ in the output wave sensor 23c, Eqn. 81, controls the beam steering mirror 17 in the marker leg, coupling the marker beam to the receiver beam expander 21e.

$$R_H = \gamma(W_P - W_M) \quad (81)$$

$$R_H = -\beta(W_Q - W_H) \quad (82)$$

$$R_Q = -\alpha(T_M - T_T) \quad (83)$$

$$M + R_M = W_M \quad (84)$$

$$T_T + R_M = W_M \quad (85)$$

$$H + R_H = W_H \quad (86)$$

$$T_M = M \quad (87)$$

$$W_Q = Q + R_Q \quad (88)$$

$$W_P = W_Q + G \quad (89)$$

$$W_H - W_T = H\frac{1}{1+\beta} - M\frac{\alpha\beta}{(1+\beta)(1+\alpha\gamma'+\gamma')} - \\ W_T\frac{1+\beta-\alpha\beta+\beta\gamma'+\alpha\gamma'+\gamma'}{(1+\beta)(1+\alpha\gamma'+\gamma')} + \\ Q\frac{\beta(1+\gamma')}{(1+\beta)(1+\alpha\gamma'+\gamma')} - G\frac{\alpha\beta\gamma'}{(1+\beta)(1+\alpha\gamma'+\gamma')} \quad (90)$$

TABLE XII

|  | H | M | Q | G | $W_T$ |
|---|---|---|---|---|---|
| LOW FREQ. α,βγ ≫ 1 | $\frac{1}{\beta}$ | $-\frac{1}{\gamma'}$ | $\frac{1}{\alpha}$ | −1 | $\frac{1}{\alpha}+\frac{1}{\beta}-\frac{1}{\gamma'}$ |
| HIGH FREQ. βγ ≫ 1 α ≪ 1 | $\frac{1}{\beta}$ | $-\frac{\alpha}{\gamma'}$ | 1 | −α | −1 |

Equations 81 through 90 define the prior art system of FIG. 10. Equation 90 defines the pointing error, and Table XII provides the high and low frequency coefficients for the terms of Eqn. 90. In Equations 89 and 90, item G represents bending of the periscope. The performance of the system against low and high frequency disturbances is apparent from the above.

Except for the periscope errors, this system works just as well as a shared aperture system. The critical item is the transfer periscope 35. Any low frequency non-rigid-body motions of the periscope are directly reflected as pointing errors. At high frequencies, periscope errors are attenuated because they cause the γ servo loop, Eqn. 81, to move the image of the target in the tracker 7. The α servo loop of the tracker 7, Eqn. 83, then tries to drive the optics 33 of the stable platform 25, but these target image motions are beyond the tracker's bandwidth and the tracker gain rolls off, attenuating the effect on the stable platform. The stable platform 25 could have been put on the receiver telescope 21e and coupled by a periscope 35 over to the transmitter telescope 21d, but then there would be no attenuation of periscope errors because they would be directly injected into the transmitter by the β servo loop.

Third Embodiment

Advantages

Figure 11:
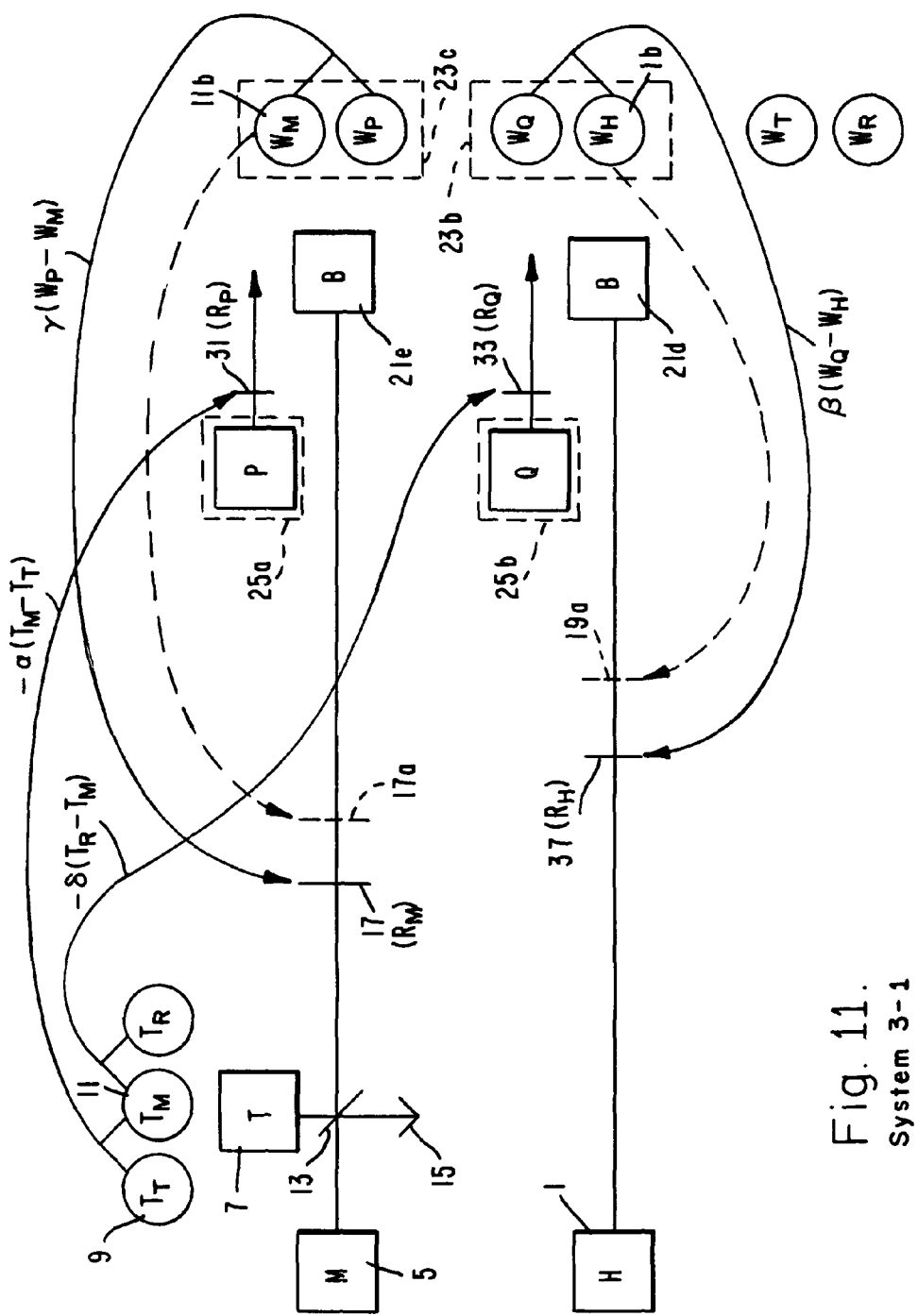
FIG. 11 is a block diagram of a first point-ahead system (System 3-1) showing a first implementation of the third embodiment of this invention.
Figure 12:
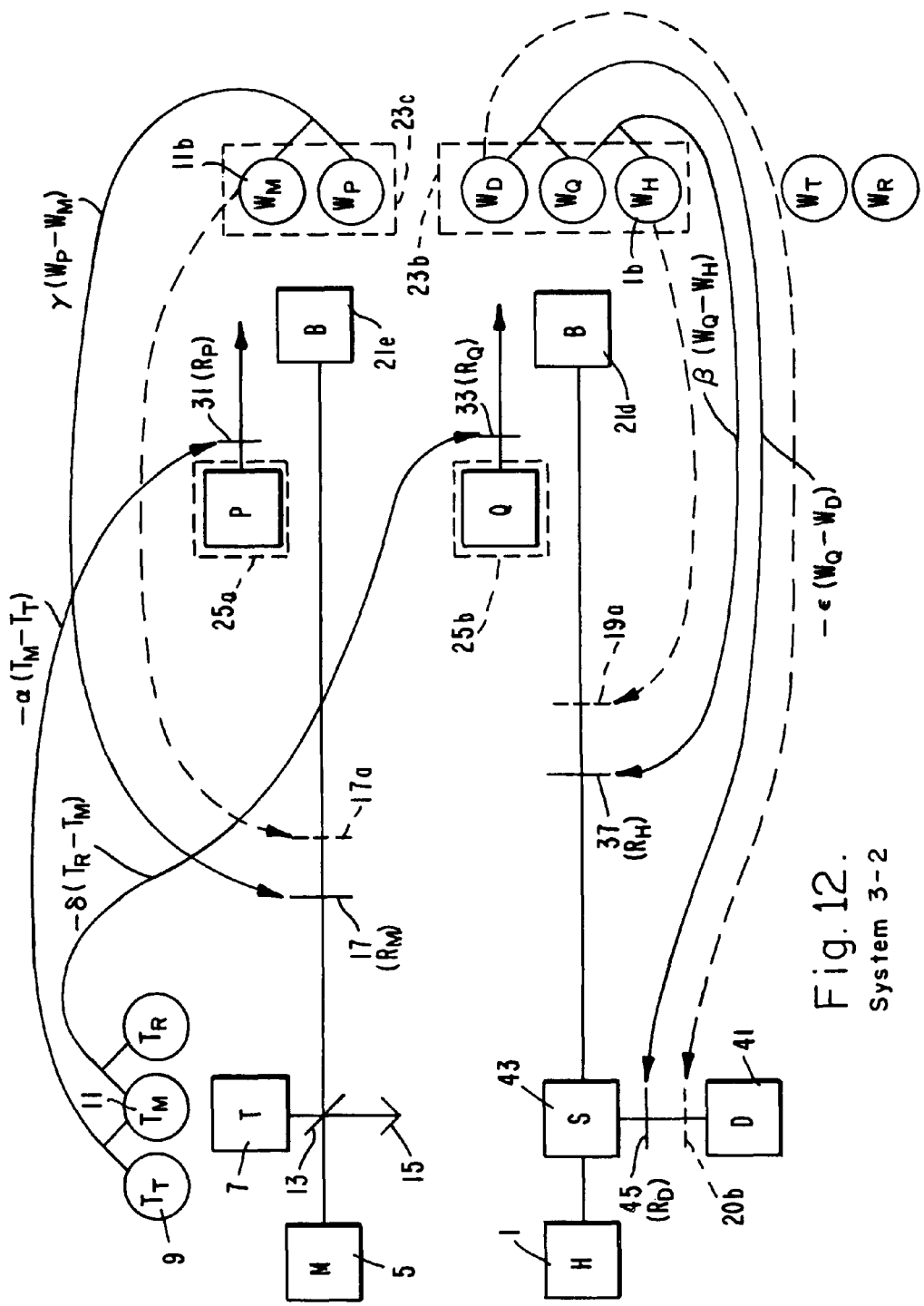
FIG. 12 is a block diagram of a second point-ahead system (System 3-2) showing a second implementation of the third embodiment of this invention.

Two separate implementations of this third embodiment, System 3-1, FIG. 11, and System 3-2, FIG. 12, are presented. These are separate aperture, inertially stabilized platform reference, laser transmitter, pointing and tracking systems with independent wavefront corrections for the transmitted laser beam and received target image. They also solve the point-ahead problem. All of the stable platform advantages are preserved in these implementations.

Separate transmitter and receiver telescopes 21d and 21e provide separate apertures. These remove the need for a high power shared aperture component 3 as employed in the embodiments of this invention described above. The shared aperture component, which is conceptually a beam splitter, allows the receiver and the transmitter to share the same telescope. Hence the term, shared aperture system. However, shared aperture systems require a shared aperture component that can operate in a high power range. Such a component has many requirements: high power operation, low backscatter of the designator (if one is used) and marker beams into the tracker, low backscatter of the source laser energy into the tracker (for those systems that sense the source laser energy to locate the current aimpoint), high efficiency for the source laser beam, high efficiency for the marker laser and designator laser beams, high efficiency for the returning target image beam, and high efficiency for the returning current aimpoint image beam.

For the highest powers, a diffraction grating is usually the only shared aperture component that can survive. A grating can be made that is efficient in transmitting a multi-wavelength high energy laser beam and in either transmitting a shorter wavelength marker or in receiving shorter wavelength target and current aimpoint images. But gratings that are presently available are not efficient in both transmitting and receiving the same wavelength. For a shared aperture system, it is desirable that the gratings be made to be efficient in transmitting the high energy laser beam and in receiving the target image and the current aimpoint image if it is from a separate designator beam, while accepting a lesser efficiency in transmitting the designator (if used) and marker laser beams and for receiving the current aimpoint image if it is from the high energy laser.

This third embodiment of this invention offers improvements in the methods of solving the point-ahead problem. It enjoys all the advantages of Systems 1-1 and 1-2. A further advantage is that there are fewer signals to be distinguished in the focal plane 23a of the output wave sensor 23 of the transmitter telescope.

Third Embodiment

System 3-1

The point-ahead solution offered by this first implementation of the third embodiment of this invention depends upon seeing the current aimpoint on the target, so it is placed on the target by adding a temporary offset to one of the pointing servo loops until the current aimpoint shows up on the target. This is described above in connection with the systems of the first embodiment of this invention. Once the current aimpoint is available, the point-ahead tracking will close on the desired aimpoint, with no offsets in the servo loops.

The point-ahead system, System 3-1, is shown in FIG. 11 and the Eqns. 91-103 defining the system are below. Attention is directed to the fact that no periscope is needed for its operation. The receiver's stable platform beam P is driven by the Q loop, which controls the beam steering mirror 31, by the comparison of the location (direction) of the target desired aimpoint $T_T$ with the location (direction) of the marker reference $T_M$ in the tracker focal plane, Eqn. 94. The tracker image is stabilized by signals derived from the locations. (directions) of the stable beam wavefront $W_P$ and the marker beam wavefront $W_M$ in the focal plane 23c of the receiver's output wave sensor, Eqn. 91. The transmitter's stable platform beam Q is driven by the difference in locations (directions) of the current aimpoint $T_R$ and the marker reference $T_M$ (or with the desired aimpoint $T_T$) in the tracker focal plane, Eqn. 93. The transmitted source laser beam H is stabilized by the difference in the locations (directions) of the wavefronts $W_Q$ and $W_H$ of the stable beam Q and the source laser beam H in the transmitter output wave sensor 23b, Eqn. 92.

$$R_H = \boldsymbol{\gamma}(W_P - W_H) \quad 91$$

$$R_H = \beta(W_Q - W_H) \quad 92$$

$$R_Q = -\delta(T_R - T_M) \quad 93$$

$$R_P = -\alpha(T_M - T_T) \quad 94$$

$$M + R_H = W_M \quad 95$$

$$T_T + R_M = W_T \quad 96$$

$$H + R_H = W_H \quad 97$$

$$T_R + R_M = W_R \quad 98$$

$$T_M = M \quad 99$$

$$W_R = W_H - \theta \quad 100$$

$$W_P = P + R_P \quad 101$$

$$W_Q = Q + R_Q \quad 102$$

$$W_H - (W_T + \theta) = H\frac{1}{1+\beta\delta+\beta} + M\frac{1}{(1+\beta\delta+\delta)(1+\alpha\gamma'+\gamma')} + \quad 103$$

$$W_T \frac{(1+\beta+\gamma'+\alpha\gamma'+\beta\gamma'+\beta\delta+\alpha\beta\gamma'+\beta\gamma'\delta)}{(1+\beta\delta+\delta)(1+\alpha\gamma'+\gamma')} +$$

-continued $$P\frac{\beta\gamma'\delta}{(1+\beta\delta+\delta)(1+\alpha\gamma'+\gamma')} + Q\frac{\beta}{1+\beta\delta+\beta} - \theta\frac{1+\beta}{1+\beta\delta+\beta}$$

TABLE XIII

| | H | M | P | Q | $W_T$ | $\theta$ |
|---|---|---|---|---|---|---|
| LOW FREQ. $\alpha,\beta\boldsymbol{\gamma}$, $\delta \gg 1$ | 1 | $\frac{1}{\beta\delta}$ | $\frac{1}{\alpha\gamma'}$ | $\frac{1}{\alpha}$ | $\frac{1}{\delta}$ | $-\left(\frac{1}{\alpha}+\frac{1}{\delta}\right)$ | $-\frac{1}{\delta}$ |
| HIGH FREQ. $\beta\boldsymbol{\gamma} \gg 1$ $\alpha,\delta \ll 1$ | 1 | $\frac{\delta}{\beta}$ | $\frac{\delta}{\gamma'}$ | $\delta$ | 1 | $-1$ | $-1$ |

Equation 103 defines the pointing error. Table XIII provides the low frequency and high frequency coefficients for the terms of the Eqn. 103. The $\alpha$ loop is of low bandwidth because the target is dim, and the $\delta$ loop will be limited by the round trip transit time, so these two gains will roll off in frequency before the high-level local loop B and $\boldsymbol{\gamma}$ gains. How the low and high frequency jitter components become pointing errors is seen in the Table. Just as for the shared aperture systems, all local jitters, even those beyond the bandwidth of the tracker, are removed by the local loops. The performance is just as good as for a shared aperture system.

Since there are three tracker images $T_T$, $T_M$, and $T_R$, being driven into coincidence by two control loops, there are three pairwise comparisons that may be made. This gives three different pointer-trackers, with slightly different properties because of the different bandwidths of the tracker image signals and the slightly different forms of the coefficients in the equations.

For wavefront correction, the marker beam wavefront $W_M$ in the output wave sensor 23c of the receiver and the source laser beam wavefront $W_H$ in the output wave sensor 23b of the transmitter are sampled by their respective output wave sensors to drive deformable mirrors 17a and 19a, respectively, in wavefront correction servo loops. Each mirror corrects independently of the other for its own telescope and its own direction of view.

Third Embodiment

System 3-2

This second implementation of the third embodiment of this invention deals with the situation where the tracker is not sensitive to the source laser beam wavelength and a current aimpoint designator must be supplied. System 3-2 is shown in FIG. 12 and Eqns. 104 to 119 defining this implementation of the third embodiment of this invention together with Table XIV are presented below. The difference in this system with respect to that of FIG. 11 resides in the addition of a designator laser beam source 41 for the purpose of introducing a designator laser beam D in the transmitter and serving the designator laser beam into alignment with the source laser beam H by comparing the direction of the designator beam D with that of the stable beam Q (or the laser source sample beam H) in the transmitter output wave sensor, Eqn. 108.

The source laser beam H and the designator laser beam D are directed into a common path by an element 43 that functions to transmit the source laser beam and to reflect the designator laser beam. In this respect the element 43 has the characteristics of a shared aperture component, but the severe requirements of a shared aperture component are not necessary here. Element 43 need be efficient only in transmitting the source laser beam, be reasonably efficient in transmitting the designator laser beam, and that's all. ("Transmitting" is used generically here, in the idea of throughput.) There are no backscatter requirements on either the source laser beam or the designator laser beam; there are no received beam requirements on either the target image or the current aimpoint image.

$$R_M = \gamma (W_P - W_M) \quad (104)$$

$$R_H = \beta (W_Q - W_H) \quad (105)$$

$$R_Q = -\delta (T_R - T_M) \quad (106)$$

$$R_P = -\alpha (T_M - T_T) \quad (107)$$

$$R_D = -\epsilon (W_Q - W_D) \quad (108)$$

$$M + R_M = W_M \quad (109)$$

$$T_T + R_M = W_T \quad (110)$$

$$W_R = W_D - \theta \quad (111)$$

$$T_M M \quad (112)$$

$$W_Q = Q + R_Q \quad (113)$$

$$W_P = P + R_P \quad (114)$$

$$D + R_D + R_H = W_D \quad (115)$$

$$H + R_H = W_H \quad (116)$$

$$T_R + R_M = W_R \quad (117)$$

$$W_H - (W + \theta) = H \frac{1 - \epsilon + \delta\beta - \delta\epsilon}{A} - D\frac{\beta\delta}{A} + M\frac{\beta\delta(1-\epsilon)}{A} + P\frac{\gamma\beta\delta(1-\epsilon)}{(1+\alpha\gamma'+\gamma')A} + Q\frac{\beta(1-\epsilon)}{A} - \theta\frac{1+\beta-\epsilon-\delta\epsilon+\beta\epsilon}{A} - W_T \frac{\begin{array}{c}1+\beta+\epsilon+\gamma'+\alpha\gamma'+\beta\gamma'+\beta\epsilon+\epsilon\gamma'-\delta\epsilon+\\ \delta\beta-\beta\delta\epsilon+\gamma'\delta(\alpha\beta+\alpha\epsilon+\beta\delta-\delta\epsilon+\beta\epsilon)+\\ \gamma'\epsilon(\alpha\beta-\alpha\delta-\beta\delta)\end{array}}{(1+\alpha\gamma'+\gamma')A} \quad (118)$$

$$A = 1 + \beta - \epsilon + \delta\beta - \delta\epsilon + \beta\epsilon - \beta\delta\epsilon \quad (119)$$

TABLE XIV

| | H | M | D | P | Q | $W_T$ | θ |
|---|---|---|---|---|---|---|---|
| LOW FREQ. $\alpha,\beta\gamma,\delta,\epsilon \gg 1$ | $\frac{1}{\beta}-\frac{1}{\epsilon}$ | $-\frac{1}{\alpha\gamma'}$ | $\frac{1}{\epsilon}$ | $\frac{1}{\alpha}$ | $\frac{1}{\delta}$ | $\frac{1}{\delta}-\frac{1}{\alpha}-\frac{1}{\beta}$ | $\frac{1}{\delta}-\frac{1}{\beta}$ |
| HIGH FREQ. $\beta\gamma,\epsilon \gg 1$ $\alpha,\delta \ll 1$ | $-\frac{1}{\beta}$ | $-\frac{\delta}{\gamma'}$ | $-\frac{\delta}{\epsilon}$ | $-\delta$ | $-1$ | $-1$ | $-1$ |

Equation 118 defines the pointing error. Table XIV provides the low frequency and high frequency coefficients for the terms of Eqn. 118. It is evident from this how low and high frequency disturbances propagate into pointing errors. Again, all the stable platform advantages are preserved.

For wavefront correction, the receiver samples the wavefront of its marker beam $W_M$ in the focal plane 23c of its output wave sensor and uses the information in a wavefront correction loop to control a deformable mirror 17a. The transmitter samples the wavefronts $W_H$ and $W_D$ of both the source laser beam H and the designator laser beam D in the focal plane 23b of its output wave sensor and uses the information in wavefront correction loops to control deformable mirrors 19a and 20b, respectively, in the appropriate legs. By these expedients, the wavefronts of the transmitted and received laser beams are corrected. In the transmitter, there are two corrections with three legs available, but the most desirable arrangement from the viewpoint of optical considerations is to put the source laser beam wavefront correction in the primary leg and the designator wavefront correction in the designator leg, as shown.

GENERAL COMMENTS

The several embodiments of this invention are not limited to the use of one specific type of output wave sensor. There are a number of ways of building output wave sensors. Some output wave sensors split the wavefront, bring one portion to a focus to get the direction, and analyze the phase profile or phase and amplitude profile of the other portion. Some output wave sensors measure only the phase and amplitude profiles and calculate the pointing direction from that without ever bringing the beam to a focus. Some output wave sensors bring the beam to a focus and carefully analyze the spread of the focused spot. Thus, while a specific output wave sensor is illustrated and described herein, other types are employable, the essential function being the measurement of the "direction" of the beam and the "wavefront" of the beam, however the output wave sensor does it.

Other types of servos may be used. Servos and servo methods are well known and are textbook subject matter. The servo design requires no experimentation and depends only upon a detailed design of a system.

The invention is not limited to the use of deformable mirrors, but can use any wavefront compensating technique, such as phase and amplitude control or phase conjugate mirrors.

The examples employed herein refer to "transmitting," "reflecting," or "diffracting" the beams. These are descriptive of specific examples and are not intended to be restrictive. In most places a "transmitting," "reflecting," or "diffracting" element can be replaced with one of the other types without the need for experimentation and with no change in the overall concept.

The use of the term "stable laser beam" or "stabilized laser beam" is intended to imply an inertially stabilized platform reference such as a stable platform beam or a beam in a system comprising a stable flat mirror and an autocollimator.

What is claimed is:

1. A shared aperture, point-ahead laser transmitter pointing and target tracking system, comprising:
   means for transmitting a source laser beam to a target;
   means for producing a marker laser beam;

means for sensing the apparent direction of a target and specifically a desired aimpoint on the target;

means for sensing the direction of said marker laser beam relative to the apparent desired aimpoint direction;

means for sensing the direction said source laser beam directed at the target actually goes relative to the desired aimpoint on the target;

means responsive to the difference between selected different pairs of the sensed directions of said apparent direction of said desired aimpoint, said marker beam relative to said target aimpoint direction, and said source laser beam's impingement relative to said desired aimpoint for controlling the direction of transmission of said source laser beam and the alignment of said marker beam in the apparent direction of the desired aimpoint; and means responsive to wavefront aberrations of said source laser beam and said marker laser beam for providing wavefront corrections in said source and marker laser beams and thereby the target image.

2. A shared aperture, point-ahead laser transmitter pointing and target tracking system, comprising:

means for transmitting a source laser beam to said target;

means for sensing the direction of said source laser beam;

means for producing a marker laser beam;

means for sensing the apparent direction of a desired aimpoint on said target;

means for sensing the direction of said marker laser beam relative to the apparent target direction;

means for producing a designator laser beam;

means for sensing the direction of said designator laser beam;

means for sensing the direction said designator laser beam directed at said target is going, relative to the desired aimpoint on the target;

means responsive to the difference in directions of said source laser beam and said designator laser beam for aligning said designator laser beam with said source laser beam; and means responsive to the difference between selected different pairs of the sensed directions of said apparent direction of said desired aimpoint, said marker beam relative to said target aimpoint direction, and said designator laser beams' impingement relative to said desired aimpoint for controlling the direction of said designator laser beam and thereby said source laser beam, and for controlling the alignment of said marker beam in the apparent direction of the desired aimpoint.

3. The invention according to claim 2, comprising:

means responsive to the wavefront aberrations of said source laser beam for correcting the wavefront of said source laser beam;

means responsive to the wavefront aberrations of said marker laser beam for correcting the wavefront of said marker laser beam; and means responsive to the wavefront aberrations of said designator laser beam for correcting the wavefront of said designator laser beam;

correction of said wavefront of said marker laser beam thereby improving the target image.

4. A shared aperture, point-ahead laser transmitter pointing and target tracking system, comprising:

means for producing a source laser beam;

means for transmitting said source laser beam to said target;

means for producing a marker laser beam;

means for sensing the apparent direction of a desired aimpoint on said target;

means for sensing the direction of said marker laser beam relative to the apparent target direction;

means for sensing the direction said source laser beam directed at the target is going relative to the desired aimpoint on the target;

means for producing a first inertially stabilized direction reference;

means for producing a second inertially stabilized direction reference;

means for sensing the direction of said first inertially stabilized direction reference;

means for sensing the direction of said second inertially stabilized direction reference;

means responsive to the difference in the sensed directions of said first inertially stabilized direction reference and said marker laser beam for stabilizing said marker laser beam direction;

means responsive to the difference in the sensed directions of said second inertially stabilized direction reference and said source laser beam for stabilizing said source laser beam;

means responsive to the difference between a first selected pair of the sensed directions of said apparent direction of said desired aimpoint, said marker laser beam relative to said apparent target aimpoint direction, and said source laser beam relative to said desired aimpoint, for controlling the direction of said first inertially stabilized direction reference; and means responsive to the difference between a selected different second pair of the sensed directions of said apparent direction of said desired aimpoint, said marker laser beam relative to said apparent target aimpoint direction, and said source laser beam relative to said desired aimpoint, for controlling the direction of said second inertially stabilized direction reference.

5. The invention according to claim 4, comprising:

means responsive to the wavefront aberrations of said source laser beam for correcting the wavefront of said source laser beam; and means responsive to the wavefront aberrations of said marker laser beam for correcting the wavefront of said marker laser beam;

correction of the wavefront of said marker laser beam thereby improving the target image.

6. A shared aperture, point-ahead laser transmitter pointing and target tracking system, comprising:

means for producing a source laser beam;

means for transmitting said source laser beam to said target;

means for producing a marker laser beam;

means for producing a designator laser beam;

means for sensing the direction of said designator laser beam;

means for sensing the apparent direction of a desired aimpoint on said target;

means for sensing the direction of said marker laser beam relative to the apparent target direction;

means for sensing the direction said source laser beam directed at the target is going relative to the desired aimpoint on the target;

means for producing a first inertially stabilized direction reference;

means for producing a second inertially stabilized direction reference;

means for sensing the direction of said first inertially stabilized direction reference;

means for sensing the direction of said second inertially stabilized direction reference;

means responsive to the difference in the sensed directions of said first inertially stabilized direction reference and said marker laser beam for stabilizing said marker laser beam direction;

means responsive to the difference between a first selected pair of the sensed directions of said second inertially stabilized direction reference, said source laser beam, and said designator laser beam for controlling said source laser beam direction;

means responsive to the difference between a second selected pair of the sensed directions of said second inertially stabilized direction reference, said source laser beam, and said designator laser beam for controlling said designator laser beam direction;

means responsive to the difference between a first selected pair of the sensed directions of said apparent direction of said desired aimpoint, said marker laser beam relative to said target aimpoint direction, and said designator laser beam relative to said desired aimpoint, for controlling the direction of said first inertially stabilized direction reference; and means responsive to the difference between a selected different second pair of the sensed directions of said apparent direction of said desired aimpoint, said marker laser beam relative to said target aimpoint direction, and said designator laser beam relative to said desired aimpoint, for controlling the direction of said second inertially stabilized direction reference.

7. The invention according to claim 6, comprising:

means responsive to the wavefront aberrations of said source laser beam for correcting the wavefront of said source laser beam;

means responsive to wavefront aberrations of said marker laser beam for correcting the wavefront of said marker laser beam; and means responsive to the wavefront aberrations of said designator laser beam for correcting the wavefront of said designator laser beam;

correction of said wavefront of said marker laser beam thereby improving the target image.

8. A separate aperture, point-ahead laser transmitter pointer and target tracking system, comprising:

first means providing a receiver optical system with a receiving aperture;

means for producing a marker laser beam in said receiver optical system;

second Means providing a transmitter optical system with a transmitting aperture;

means for producing a source laser beam in said transmitter optical system;

means for sensing the apparent direction of a desired aimpoint on said target;

means for sensing the direction of said marker laser beam relative to the apparent target direction;

means for sensing the direction said source laser beam directed at the target actually goes, relative to the desired aimpoint on the target;

means for producing a first inertially stabilized direction reference within said receiving optical system;

means for producing a second inertially stabilized direction reference within said transmitting optical system;

means for sensing the direction of said first inertially stabilized direction reference;

means for sensing the direction of said second inertially stabilized direction reference;

means responsive to the difference in the sensed directions of said first inertially stabilized direction reference and said marker laser beam for stabilizing said marker laser beam direction;

means responsive to the difference in the sensed directions of said second inertially stabilized direction reference and said source laser beam for stabilizing said source laser beam direction;

means responsive to the difference between a first selected pair of the sensed directions of said apparent direction of said desired aimpoint, said marker beam relative to said apparent target direction, and said source laser beam relative to said desired aimpoint, for controlling the direction of said first inertially stabilized direction reference; and means responsive to the difference between a selected different second pair of the sensed directions of said apparent direction of said desired aimpoint, said marker beam relative to said apparent target direction, and said source laser beam relative to said desired aimpoint, for controlling the direction of said second inertially stabilized direction reference.

9. The invention according to claim 8, comprising:

means responsive to the wavefront aberrations of said source laser beam for correcting the wavefront of said source laser beam; and means responsive to the wavefront aberrations of said marker laser beam for correcting the wavefront of said marker laser beam;

said marker correction thereby also correcting the target image.

10. A separate aperture, point-ahead laser transmitter pointer and target tracking system, comprising:

first means providing a receiver optical system with a receiving aperture;

means for producing a marker laser beam in said receiver optical system;

second means providing a transmitter optical system with a transmitting aperture;

means for producing a source laser beam in said transmitter optical system;

means for sensing the apparent direction of a desired aimpoint on said target;

means for sensing the direction of said marker laser beam relative to the apparent target direction;

means for producing a designator laser beam;

means for sensing the direction of said designator laser beam;

means for sensing the direction said designator laser beam directed at the target actually goes, relative to the desired aimpoint on the target;

means for producing a first inertially stabilized direction reference within said receiving optical system;

means for producing a second inertially stabilized direction reference within said transmitting optical system;

means for sensing the direction of said first inertially stabilized direction reference;

means for sensing the direction of said second inertially stabilized direction reference;

means responsive to the difference in the sensed directions of said first inertially stabilized direction reference and said marker laser beam for stabilizing said marker laser beam direction;

means responsive to the difference between a first selected pair of the sensed directions of said second inertially stabilized direction reference, said source laser beam, and said designator laser beam for controlling said source laser beam direction;

means responsive to the difference between a second selected pair of the sensed directions of said second inertially stabilized direction reference, said source laser beam, and said designator laser beam for controlling said designator laser beam direction;

means responsive to the difference between a first selected pair of the sensed directions of said apparent direction of said desired aimpoint, said marker laser beam relative to said apparent direction, and said designator laser beam relative to said desired aimpoint, for controlling the direction of said first inertially stabilized direction reference; and means responsive to the difference between a selected different second pair of the sensed directions of said apparent direction of said desired aimpoint, said marker laser beam relative to said apparent target direction, and said designator laser beam relative to said desired aimpoint, for controlling the direction of said second direction stabilized laser beam.

11. The invention according to claim 10, comprising:

means responsive to the wavefront aberrations of said source laser beam for correcting the wavefront of said source laser beam;

means responsive to the wavefront aberrations of said marker laser beam for correcting the wavefront of said marker laser beam; and means responsive to the wavefront aberrations of said designator laser beam for correcting the wavefront of said designator laser beam;

correction of said wavefront of said marker laser beam thereby improving the target image.

* * * * *